(12) United States Patent
Jang

(10) Patent No.: US 11,941,694 B2
(45) Date of Patent: Mar. 26, 2024

(54) COMPRESSION OF VALUE CHANGE DATA

(71) Applicant: Chicago Mercantile Exchange Inc., Chicago, IL (US)

(72) Inventor: Seo Wook Jang, Jersey City, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 17/697,522

(22) Filed: Mar. 17, 2022

(65) Prior Publication Data

US 2022/0207613 A1 Jun. 30, 2022

Related U.S. Application Data

(63) Continuation of application No. 14/587,467, filed on Dec. 31, 2014, now Pat. No. 11,315,181.

(51) Int. Cl.
*G06Q 40/04* (2012.01)
*G06F 16/2457* (2019.01)
*G06Q 40/00* (2023.01)

(52) U.S. Cl.
CPC ....... *G06Q 40/04* (2013.01); *G06F 16/24575* (2019.01); *G06F 16/24578* (2019.01); *G06Q 40/00* (2013.01)

(58) Field of Classification Search
None
See application file for complete search history.

(56) References Cited

U.S. PATENT DOCUMENTS

| | | | |
|---|---|---|---|
| 4,674,044 A | 6/1987 | Kalmus et al. | |
| 5,101,353 A | 3/1992 | Lupien et al. | |
| 5,136,501 A | 8/1992 | Silverman et al. | |
| 5,168,446 A | 12/1992 | Wiseman | |
| 5,297,031 A | 3/1994 | Gutterman et al. | |
| 5,297,032 A | 3/1994 | Trojan et al. | |
| 5,347,452 A | 9/1994 | Bay, Jr. | |
| 5,689,651 A | 11/1997 | Lozman | |
| 5,689,652 A | 11/1997 | Lupien et al. | |
| 5,717,989 A | 2/1998 | Tozzoli et al. | |
| 5,809,483 A | 9/1998 | Broka et al. | |
| 5,845,266 A | 12/1998 | Lupien et al. | |
| 5,873,071 A | 2/1999 | Ferstenberg et al. | |
| 5,884,286 A | 3/1999 | Daughtery, III | |

(Continued)

FOREIGN PATENT DOCUMENTS

EP 0 401 203 A2 12/1990
EP 0401203 A2 12/1990

(Continued)

OTHER PUBLICATIONS

Barr, Paul G. "Electronics Move Bond Side Out of the Shadows," Pensions and Investments, Jun. 29, 1998, 3 pages.

(Continued)

*Primary Examiner* — William J Jacob
(74) *Attorney, Agent, or Firm* — Lempia Summerfield Katz LLC

(57) ABSTRACT

A computer system compresses value change data. Value change ranges are identified for value changes corresponding to different times. Codes are selected based on the identified value change ranges. The value change range codes are concatenated with machine-coded categories and stored. The stored concatenated codes are used for transaction validation.

20 Claims, 8 Drawing Sheets

(56) References Cited

U.S. PATENT DOCUMENTS

| | | |
|---|---|---|
| 5,924,062 A | 7/1999 | Maung |
| 5,924,082 A | 7/1999 | Silverman et al. |
| 5,924,083 A | 7/1999 | Silverman et al. |
| 5,950,177 A | 9/1999 | Lupien et al. |
| 5,950,178 A | 9/1999 | Borgato |
| 5,963,923 A | 10/1999 | Garber |
| 5,999,918 A | 12/1999 | Williams et al. |
| 6,012,046 A | 1/2000 | Lupien et al. |
| 6,014,643 A | 1/2000 | Minton |
| 6,016,482 A | 1/2000 | Molinari et al. |
| 6,024,641 A | 2/2000 | Samo |
| 6,098,051 A | 8/2000 | Lupien et al. |
| 6,112,189 A | 8/2000 | Rickard et al. |
| 6,126,543 A | 10/2000 | Friedman |
| 6,134,535 A | 10/2000 | Belzberg |
| 6,134,536 A | 10/2000 | Shepherd |
| 6,199,050 B1 | 3/2001 | Alaia et al. |
| 6,309,307 B1 | 10/2001 | Krause et al. |
| 6,321,212 B1 | 11/2001 | Lange |
| 6,370,516 B1* | 4/2002 | Reese .................. G06Q 40/06 705/36 R |
| 6,418,419 B1 | 7/2002 | Nieboer et al. |
| 6,519,574 B1 | 2/2003 | Wilton et al. |
| 6,601,044 B1 | 7/2003 | Wallman |
| 6,609,118 B1 | 8/2003 | Khedkar et al. |
| 6,952,682 B1 | 10/2005 | Wellman |
| 7,024,387 B1 | 4/2006 | Nieboer et al. |
| 7,039,610 B2 | 5/2006 | Morano et al. |
| 7,089,204 B1 | 8/2006 | Nieboer et al. |
| 7,124,107 B1 | 10/2006 | Pishevar et al. |
| 7,152,041 B2 | 12/2006 | Salavadori et al. |
| 7,260,554 B2 | 8/2007 | Morano et al. |
| 7,831,491 B2 | 11/2010 | Newell |
| 8,229,820 B2 | 7/2012 | Newell et al. |
| 8,341,056 B2 | 12/2012 | Newell et al. |
| 8,560,443 B2 | 10/2013 | Northey et al. |
| 8,626,625 B2 | 1/2014 | Newell et al. |
| 9,407,285 B2* | 8/2016 | Kozak .................. G06F 3/0619 |
| 2001/0042040 A1 | 11/2001 | Keith |
| 2002/0004774 A1* | 1/2002 | Defarlo .................. G06Q 40/04 705/37 |
| 2002/0065752 A1* | 5/2002 | Lewis .................. G06Q 30/04 705/35 |
| 2002/0099640 A1* | 7/2002 | Lange .................. G07F 17/3288 705/37 |
| 2002/0178104 A1* | 11/2002 | Hausman .................. G06Q 40/04 705/37 |
| 2003/0014356 A1* | 1/2003 | Browne .................. G06Q 40/04 705/38 |
| 2003/0054875 A1 | 3/2003 | Marks et al. |
| 2003/0078865 A1* | 4/2003 | Lee .................. G06Q 40/00 705/35 |
| 2004/0117285 A1* | 6/2004 | Kohler .................. G06Q 40/06 705/36 R |
| 2004/0193526 A1 | 9/2004 | Singer et al. |
| 2004/0210511 A1* | 10/2004 | Waelbroeck .................. G06Q 40/04 705/37 |
| 2005/0096999 A1 | 5/2005 | Newell |
| 2005/0102229 A1* | 5/2005 | Kemper .................. G06Q 40/03 705/18 |
| 2007/0150401 A1 | 6/2007 | Brucato et al. |
| 2008/0032778 A1 | 2/2008 | Amaitis et al. |
| 2008/0262976 A1* | 10/2008 | Gvelesiani .................. G06Q 40/06 705/36 R |
| 2009/0221357 A1 | 9/2009 | Amaitis et al. |
| 2010/0009743 A1 | 1/2010 | Amaitis et al. |
| 2011/0087617 A1* | 4/2011 | Turner .................. G06Q 40/06 705/36 R |
| 2011/0187711 A1* | 8/2011 | Giovinazzi .................. G06Q 40/06 345/419 |
| 2011/0256922 A1 | 10/2011 | Amaitis et al. |
| 2013/0204832 A1* | 8/2013 | Juola .................. G06N 5/04 706/48 |
| 2014/0019329 A1 | 1/2014 | Newell et al. |
| 2014/0089164 A1 | 3/2014 | Newell et al. |
| 2014/0164201 A1* | 6/2014 | Boberski .................. G06Q 40/04 705/37 |
| 2015/0127516 A1* | 5/2015 | Studnitzer .................. G06Q 40/06 705/37 |

FOREIGN PATENT DOCUMENTS

| | | |
|---|---|---|
| EP | 0 411 748 A2 | 2/1991 |
| EP | 0411748 A2 | 2/1991 |
| EP | 1552383 A1 | 7/2005 |
| GB | 1574447 A | 9/1980 |
| GB | 2180675 A | 4/1987 |
| GB | 2299425 A | 10/1996 |
| GB | 2400202 A | 10/2004 |
| JP | 2001513081 A | 7/2000 |
| JP | 2001-513081 A | 8/2001 |
| JP | 2003-505794 A | 2/2003 |
| JP | 2004-504652 A | 2/2004 |
| JP | 2004504652 A | 2/2004 |
| KR | 20020096402 A | 12/2002 |
| RU | 2002 104 715 A | 8/2003 |
| RU | 2002104715 A | 8/2003 |
| WO | 92/12488 A1 | 7/1992 |
| WO | 96/34357 A1 | 10/1996 |
| WO | 9634357 A1 | 10/1996 |
| WO | 98/36777 A1 | 8/1998 |
| WO | 98/41942 A1 | 9/1998 |
| WO | 9841942 A1 | 9/1998 |
| WO | 99/14695 A1 | 3/1999 |
| WO | 9914695 A1 | 3/1999 |
| WO | 99/31613 A1 | 6/1999 |
| WO | 9931613 A1 | 6/1999 |
| WO | 0062187 A2 | 10/2000 |
| WO | 00/79442 A1 | 12/2000 |
| WO | 01/08065 A1 | 2/2001 |
| WO | 0108065 A1 | 2/2001 |
| WO | 01/65403 A2 | 9/2001 |
| WO | 01/77957 A1 | 10/2001 |
| WO | 2004079520 A2 | 9/2004 |
| WO | 2005057459 A1 | 6/2005 |
| WO | 2006069350 A2 | 6/2006 |
| WO | 2014099157 A1 | 6/2014 |
| ZA | 976302 B | 2/1998 |

OTHER PUBLICATIONS

Barrett, Alexandra "Java Messaging Ensures Data Delivery," Information Week, Nov. 29, 1999, 4 pages.

Batchelor, Charles "Reuters Takes on the Stock Exchange," Financial Times, May 23, 1985, 1 page.

Beam, Carrie "CXN: A Case Study", CMIT Working Paper 97-WP-1025, Oct. 14, 1997, 15 pages.

Becker, Ellis "Mega Real Estate Auction Counts on Imaging," ComputerWorld, Dec. 7, 1992, 1 page.

Beeder, David C. "Video Auction Attracts 300 Cattlemen," The Omaha World-Herald, Feb. 8, 1985, 2 pages.

Belsie, Laurent "Details and Delays Bog Down FCC Bid to Try New Auction System Former use of Lottery Fails to Build Base for New Technologies," Christian Science Monitor, Apr. 25, 1994, 2 pages.

Berg et al., "Short and Long Run Dependence in Swedish Stock Returns," Working Paper Series 1996, Uppsala University, Department of Economics. pp. 1-19.

Bergman, Bill "Are Futures Trading Pits History?," CRB Trader Archive, 1999, vol. 8, No. 3, pp. 1-7.

Bernstein, Jake "How the Futures Markets Work", New York Institute of Finance, Paramus, NJ, 1989, pp. 62-67.

Berss, Marcia "Bond Bully," Forbes, May 28, 1990, pp. 42-43.

Bertin, Oliver "Cattle Auctions are on the Road to Extinction," The Globe and Mail, Mar. 15, 1982, 2 pages.

Bertsekas et al., "A Forward/Reverse Auction Algorithm for Asymmetric Assignment Problems," Computational Optimization and Applications, Dec. 1992, vol. 1, No. 3, 1 page.

(56) References Cited

OTHER PUBLICATIONS

Bichler et al., "Multi-Attribute Auctions for Electronic Procurement," Vienna University of Economics and Business Administration & Fisher Center for Management and Information Technology, pp. 1-13.
Bisbee, Dana "Museum Fund-Raiser is Sold on the Internet," Boston Herald, May 22, 1995, 2 pages.
Bittman, James B. "Trading Index Options", McGraw Hill, NY., 1998, 169 pages.
Black, Fischer "Toward a Fully Automated Stock Exchange," Financial Analysts Journal, Nov./Dec. 1971, pp. 25-87.
Bleiberg, Robert M. "Market Winner—Financial Futures Have Scored Remarkable Gains," Barron's National Business and Financial Weekly, Nov. 30, 1981, 1 page.
Bollerslev et al., "Some Effects of Restricting the Electronic Order Book in an Automated Trade Execution System," The Double Auction Market, Addison-Wesley, 1993, pp. 221-252.
BondWeek, vol. XII, No. 42, Oct. 19, 1992, 2 pages.
BondWeek, vol. X, No. 14, Apr. 9, 1990, 2 pages.
BondWeek, vol. XI, No. 16, Apr. 22, 1991, 2 pages.
BondWeek, vol. XI, No. 32, Aug. 12, 1991, 2 pages.
BondWeek, vol. XII, No. 34, Aug. 24, 1992, 2 pages.
BondWeek, vol. XIII, No. 34, Aug. 30, 1993, 2 pages.
BondWeek, vol. XI, No. 50, Dec. 16, 1991, 2 pages.
BondWeek, vol. X, No. 51, Dec. 24, 1990, 3 pages.
BondWeek, vol. XIII, No. 5, Feb. 8, 1993, 2 pages.
BondWeek, vol. XI, No. 8, Feb. 25, 1991, 2 pages.
BondWeek, vol. XV, No. 4, Jan. 30, 1995, 2 pages.
BondWeek, vol. X, No. 1, Jan. 8, 1990, 2 pages.
BondWeek, vol. X, No. 2, Jan. 15, 1990, 3 pages.
BondWeek, vol. XI, No. 26, Jul. 1, 1991, 2 pages.
BondWeek, vol. X, No. 26, Jul. 2, 1990, 2 pages.
BondWeek, vol. XII, No. 30, Jul. 27, 1992, 2 pages.
BondWeek, vol. XII, No. 22, Jun. 1, 1992, 2 pages.
BondWeek, vol. XI, No. 22, Jun. 3, 1991, 2 pages.
BondWeek, vol. XII, No. 24, Jun. 15, 1992, 2 pages.
BondWeek, vol. XVII, No. 8, Mar. 3, 1997, 2 pages.
BondWeek, vol. XII, No. 10, Mar. 9, 1992, 2 pages.
BondWeek, vol. XI, No. 10, Mar. 11, 1991, 2 pages.
BondWeek, vol. X, No. 10, Mar. 12, 1990, 2 pages.
BondWeek, vol. XIII, No. 10, Mar. 15, 1993, 2 pages.
BondWeek, vol. XII, No. 12, Mar. 23, 1992, 2 pages.
BondWeek, vol. XVII, No. 17, May 5, 1997, 2 pages.
BondWeek, vol. XII, No. 20, May 18, 1992, 2 pages.
BondWeek, vol. XI, No. 20, May 20, 1991, 2 pages.
BondWeek, vol. XII, No. 46, Nov. 16, 1992, 2 pages.
BondWeek, vol. XV No. 46, Nov. 20, 1995, 2 pages.
BondWeek, vol. XII, No. 40, Oct. 5, 1992, 2 pages.
"Trading Pad," GL Trade, Paris, 8 pages.
"Trading systems," Banking World, Mar. 1988, 2 pages.
"Trading Technologies," Futures & OTC World, 1 page.
"Trading: Bank of New York Acquires BondNet; Only live, on-line execution system for bonds," The American Banker, Inc, Oct. 6, 1997, 2 pages.
"Tradition Financial Services," TFSbrokers.com, <http://www.tfsenergy.com/company.html>, 1 page.
"Transaction Terms & Conditions—A Legal Document," BookIt, from TT&C Jul. 1991, Marketel International, Inc., San Francisco, CA, 4 pages.
"Treasury-Auction System: GAO Report Chided Treasury, Fed," Dow Jones News Service, Jul. 1, 1993, Dow Jones & Co., Inc., 1 page.
"Triangle Associates," Fact Sheet, Appendix I, 1 page.
"TST Interviews Bob McFarlane, Head of Consultants Interport," Trading Systems Technology, Waters Information Services, Inc., Jul. 1, 1991, 6 pages.
"Unusual Farmland Auction Set," Harrison Scott Publications, Inc., Liquidation Alert, Mar. 28, 1994, 2 pages.
"User Guide," GLOBEX, 1994, Reuters, 335 pages.
"User Guide," GLOBEX, Jan. 1997, Reuters, 133 pages.
"User Guide," GLOBEX, Jun. 1995, Reuters, 368 pages.
"Using GLFI," Version 1.7, GL Consultants, Paris, May 1997, 32 pages.
"USPTO Presentation," NASDAQ, Nov. 8, 2001, 16 pages.
"Utopia hosts first live auction on the Internet," Business Wire, Apr. 23, 1996, Business Wire, Inc, 2 pages.
"Value of Spread Trading on NYMEX ACCESS", 9 pages.
"Video auction puts Hawaii sites on block," The San Diego Union-Tribune, Jul. 21, 1985, 1 page.
"Want to Play the Market? Try Index Futures," Dollar, May 1982, 1 Page.
"Welcome to the Iowa Electronic Markets!," University of Iowa, Nov. 27, 1999, <http://www.biziowa.edu/iem/about.html>, 12 pages.
"What is Tradesports?," Tradesports.com, <http://www.tradesports.com>, 2 pages.
"Wine Auction on the Web," Newsbytes, May 25, 1995, Post-Newsweek Business Information Inc., 1 page.
"Wireless networks: Auction fever," The Economist, The Economist Newspaper, Ltd, Dec. 3, 1994, 2 pages.
"WOSA Extensions for Real-Time Market Data,", Microsoft Corporation, Jan. 1994, 8 pages.
"X_TRADER(tm) Product Information," Trading Technologies International, Inc., 2 pages.
"Yahoo! Finance—Option Chain SUNW," Yahoo, Oct. 8, 2002 <http://finance.yahoo.com/q?s=SUNW&d=o&q=F>, 1 page.
Abel et al., "Trader to Broker," 1989, pp. 63-77.
Abell, Howard "Spread Trading: Low-Risk strategies for Profiting from Market Relationships", Dearborn Financial Publishing, Inc., Chicago, Jun. 1997, 108 pages.
Adam, Nigel "Exxon's Quiet Auction Brings Uproar to Wall Street," Euromoney, Dec. 1982, 4 pages.
Adelberg et al., "Overview of the Stanford Real-time Information Processor (STRIP)", Stanford University Telecommunications Center, 4 pages.
Alotta, Joseph A. "Project Nimble: An Automated Equity Options Market Making System," Computerized Trading: Maximizing Day Trading and Overnight Profits, Appendix D, 1999, 12 pages.
Amaitis et al., "System and Method for Wagering based on Financial Market Indicators," Apr. 29, 2004, 25 pages.
Amihud et al., "An Integrated Computerized Trading System," Market Making and the Changing Structure of the Securities Industry, Lexington, MA: Lexington Books, Chapter 15, 1985, 12 pages.
Amihud et al., "European Financial Integration," Cambridge University Press, Great Britain, Chapter 4, 1991, 29 pages.
Angrist, Stanley W. "Iowa Market Takes Stock of Presidential Candidates," The Wall Street Journal—Money & Investing Update, Aug. 28, 1995, pp. 1-2.
Arditti, Fred D. "Derivatives: A Comprehensive Resource for Options, Futures, Interest Rate Swaps, and Mortgage Securities", Harvard Business School P, Boston, MA., 1996, 215 pages.
Atel, N (CHF) "Classic Order Book and Detailed Order Book," Screenshots, 2 pages.
"Automation of Securities Markets and Regulatory Implications," Organisation for Economic Co-operation and Financial Market Trends, Oct. 1991, ISSN:0378-651X, Section No. 50, 34 pages.
Aversa, Jeannine "Bidding in High-Tech Airwaves Auction to be Handled by Computer, of Course," Buffalo News, Dec. 5, 1994, 2 pages.
Bailey et al., "A Comparison of Video Cattle Auction and Regional Market Prices," American Journal of Agricultural Economics, May 1991, pp. 465-475.
Bailey et al., "Identifying Buyer Market Areas and the Impact of Buyer Concentration in Feeder Cattle Markets Using Mapping and Spatial Statistics," American Journal of Agricultural Economics, May 1995, vol. 77, No. 2, 9 pages.
Baird, Allen Jan "Option Market Making", 1993, John Wiley & Sons, Inc., New York, 110 pages.
Bamberg et al., "The Intraday Ex Ante Profitability of DAX-Futures Arbitrage for Institutional Investors in Germany—The Case of Early and Late Transactions," Finanzmarkt und Portfolio Management, 1994, vol. 8, No. 1, pp. 50-62.

(56) References Cited

OTHER PUBLICATIONS

Banatre et al., "The Design and Building of Enchere, A Distributed Electronic Marketing System," Communications of the ACM/ACM, Jan. 1986, vol. 29, No. 1, pp. 19-29.

Banatre, Michel "Distributed Auction Bidding System," Computer Communications, IPC Business Press, Aug. 1981, vol. 4, Issue 4, pp. 179-186.

Banatre, Michel "Enchere: A Distributed Auction Bidding System," 6th International Computing Symposium, London, 1981, pp. 3-9.

Banks, Howard "Great Expectations," Forbes, Dec. 2, 1996, pp. 110-112.

Banning, Edward "Rare Coin Auctions Enter the Video Technology Era," The Globe and Mail, May 23, 1987, 2 pages.

Barlow et al., "Barlow & Lavin: Reviews", 2 pages.

Barney, Lee "Audit Trail D-Day; Commodity Futures Trading Commission Regulations May Deail AUDIT Handheld Electronic Trading Card," Wall Street & Technology, Miller Freeman, Inc., Oct. 1995, vol. 13, No. 10, 6 pages.

Lyons, Richard K., "Foreign Exchange Volume: Sound and Fury Signifying Nothing?", 1 page.

Cordero et al., Der Schweizerische Options-Und Financial-Futures Markt (SOFFEX): Ein Update, Finanzmarkt Und Portfolio Management, vol. 2, No. 1, 1988, pp. 67-72.

Court, Chris "Armchair Market Plan for Livestock Farmers," Press Association Newsfile, Nov. 8, 1992, 1 page.

Court, Chris "Satellite Link Takes Armchair Market to Farmers," Press Association Newsfile, Jul. 12, 1992, 1 page.

Cox et al., "Options Markets," Prentice-Hall, Englewood Cliff, NJ, 1985, 259 pages.

Cramton, Peter "Combinatorial Auctions", The MIT Press, Cambridge, Massachusetts, London, England, 2006, 648 pages.

Crockett, Barton "INSTINET: Pushbutton Stock Trading Comes of Age," Information Week, Nov. 2, 1987, 4 pages.

Daffron, Stephen C. "NYMEX ACCESS Spread Functionality," Letter to R. Patrick Thomson, New York Mercantile Exchange, New York, NY., Mar. 16, 1992, 4 pages.

Daigler, Robert T. "Advanced Options Trading: The Analysis and Evaluation of Trading Strategies, Hedging Tactics, & Pricing Models", McGraw Hill, 177 pages.

Daigler, Robert T. "Financial Future Markets: Concepts, Evidence, and Applications," Harper Collins College Publishers, 1993, 24 pages.

Dalton, Gregory "Wall St. Trades Up," Informationweek, No. 739, Jun. 21, 1999, pp. 5-8.

Dass, Harish "FASB: Foreign Currency Hedges: Hedging Foreign-Currency Denominated Interest Payments," Financial Accounting Standards Board, Email, Mar. 2, 2007, pp. 1-3.

Dator, Jim "Futures of Japan—Then and Now," For the Center for Asia-Pacific Exchange, May 3, 2003, pp. 1-6.

Davies, Ben "A Boost for Bonds," Euromoney, Aug. 1995, 4 pages.

Davila, Gabriella "Do Satellites Dream of Electric Sheep?," Precision Marketing, Jul. 10, 1995, pp. 2-3.

De Bel, Jan "Automated Trading Systems and the Concept of an "Exchange" in an International Context Proprietary Systems: A Regulatory Headachel," University of Pennsylvania Journal of International Law, vol. 14, No. 2, 1993, pp. 169-211.

De Silva, Janet "Wool Unravels the Past," Australian Financial Review, May 5, 1989, pp. 1-5.

Del Rosso, Laura "Marketel Says it Plans to Launch Air Fare 'Auction' in June (Marketel International Inc.)," Travel Weekly, Apr. 29, 1991, 3 pages.

Demange et al., "Multi-Item Auctions," The Journal of Political Economy, vol. 94, No. 4, Aug. 1986, 11 pages.

Demarchi et al., "Equity Trading Systems in Europe: A Survey of Recent Changes," SBF-Bourse de Paris, Feb. 1998, pp. 1-54.

Demarchi et al., "Equity Trading Systems in Europe: A Survey of Recent Changes," Annales D'Economie et de Statistique, 2000, No. 60, 44 pages.

Demille, Ginger R. "Trading Technologies Combines Automated Spread Trading with Multi-Exchange Access and JItrafast Front-End-X_Trader(R) Pro Introduces TT Autospreader (TM), Enabling Traders to Work Cross-Exchange Spreads Automatically," Business Wire, Apr. 11, 2002, pp. 1.

Division of Trading and Markets, "Chicago Mercantile Exchange's Proposed Globex Trading System," The Commission, Feb. 2, 1989, 157 pages.

Doler, Kathleen "Computers & Automation Going, Going . . . Technology is Making Antiques of Public Auctions—The Rhythmic Palaver of the Auctioneer. The Wink and Nod of the Skillful Bidder. For Good or Ill, these Scenes from the Public real estateauction are Quickly becoming Charming Relics of the Past. Computers and Auctions," Investor's Business Daily, May 4, 1994, pp. 1-2.

Domowitz et. al., "Automation, Trading Costs, and the Structure of the Securities Trading Industry." Brookings-Wharton Papers on Financial Services, 1999, pp. 33-92.

Domowitz, Ian "A Taxonomy of Automated Trade Execution Systems," Journal of International Money and Finance, 1993, vol. 12, pp. 607-631.

Domowitz, Ian "Automating the Continuous Double Auction in Practice: Automated Trade Execution Systems in Financial Markets," SFI Studies in the Sciences of Complexity, 1993, vol. XIV, 18 pages.

Domowitz, Ian "Automating the Price Discovery Process: Some International Comparisons and Regulatory Implications," Journal of Financial Services Research, 1992, pp. 305-326.

Domowitz, Ian "Equally Open and Competitive: Regulatory Approval of Automated Trade Execution in the Futures Markets," Journal of Futures Markets, vol. 13, No. 1, 1993, 11 pages.

Domowitz, Ian "The Mechanics of Automated Trade Execution Systems," Journal of Financial Intermediation, vol. 1, 1990, pp. 167-194.

Downes et al., "Dictionary of Finance and Investment Terms," Fourth Edition, Barron's Educational Series, Inc., 1995, 11 pages.

Downes et al., "Dictionary of Finance and Investment Terms," Fifth Edition, Barron's Educational Series, Inc., 1998, 3 pages.

Dubofsky, David A. "Options and Financial Futures: Valuation and Use"s, McGraw-Hill, 1992, 6 pages.

Dunne, Nancy "Dawn of Electronic Age for Futures," London Financial Times, Dec. 23, 1981, pp. 17.

Dyson, Esther "Information, Bid and Asked," Forbes, Aug. 30, 1991, 1 page.

Economides et al., "Electronic Call Market Trading," Journal of Portfolio Management, Spring 1995, pp. 10-18.

Economides et al., "Equity Trading Practices and Market Structure: Assessing Asset Managers' Demand for Immediacy," Financial Markets, Institutions, & Instruments, vol. 4, No. 4, Nov. 1995, 50 pages.

Ederington, Louis H. "Appendix H—Living with Inflation: A Proposal for New Futures and Options Markets," Reprinted from Financial Analysts Journal, Jan./Feb. 1980, pp. 1-8.

Edwards, Laure "Five Keys to Managing Derivatives. Risk Management," Pension Management, Sep. 1995, vol. 31, No. 9, 5 pages.

Edwards, Mark "Portfolio Manager to Trader," Transaction Costs/Trading Costs, 16 pages.

Eisenberg et al., "Consensus of Subjective Probabilities: The Pari-Mutuel Method," Annals of Mathematical Statistics, vol. 30, No. 1, Mar. 1959, 5 pages.

Ellis, Charles D. "Liquidity and Trading Costs: A Modest Proposal," The Editor Asks, 3 pages.

Emmerich et al., "Markup Meets Middleware," IEEE, 1999, pp. 261-266.

Epstein, Chuck "Electronic Bond Trading Systems Pass Critical Mass," Wall Street & Technology, Second Quarter 1999, pp. 1-4.

ETS Training Group, "Project A: Reference Guide," 62 pages.

Ettorre, Barbara "Faces Behind the Figures," Forbes, Aug. 30, 1982, pp. 139.

Fainaru, Steve "What Overnight Market? Heralded as Wave of the Future, After-Hours Stock Trading has been Greeted with Yawns" The Boston Globe, Jul. 31, 1994, pp. 2-4.

Fan et al., "The Design and Development of a Financial Cybermarket with a Bundle Trading Mechanism," International Journal of Electronic Commerce, vol. 4, No. 1, Fall 1999, pp. 1-9.

Feinberg, Andrew "Stampede!", Venture, Sep. 1987, 2 pages.

(56) References Cited

OTHER PUBLICATIONS

Feldman, Joan M. "To Rein in Those CRSs," Air Transport World, New York, vol. 28, No. 12, Dec. 1991, pp. 1-7.
Ferris, Stephen P. "Automated Trade Execution and Trading Activity: The Case of the Vancouver Stock Exchange," Journal of International Financial Markets, Institutions & Money, vol. 7, 1997, pp. 61-72.
Harris et al., "At This Auction, You Can Bid By Computer," Business Week, Jan. 19, 1987, pp. 2.
Harris, Lawrence E. "Liquidity, Trading Rules and Electronic Trading Systems," New York University Salomon Center, Apr. 1990, 33 pages.
Harverson, Patrick "Age of Automation Reaches New York Bond Auctions—From Today, Dealers will Bid by Computer on the World's Largest Securities Market," Financial Times (London), Apr. 29, 1993, pp. 2-4.
Harverson, Patrick "Bond Auctions Go Modern: New York Computers Take Over from Sheets of Paper and Boxes," Financial Times of London, May 4, 1993, pp. 1-2.
Hausch et al., Efficiency of Racetrack Betting Markets, Academic Press, 1994, 335 pages.
Hawkins, Phil "Illiquid Bonds, Stocks to Hit Auction Block," Investor's Daily, Jun. 15, 1990, pp. 2-3.
Heng et al., "Competitiveness of the Singapore Economy: A Strategic Perspective," Singapore University Press, World Scientific, 1998, 189 pages.
Henkel, Tom "Cincinnati's Most Sophisticated Automated Stock Exchange Replacing Humans," Computerworld, Feb. 14, 1983, 1 page.
Henry, Michael "The Automated Electronic Exchange SOFFEX," Elektronische Markte, No. 5, Sep. 1992, 1 page.
Hershey Jr., Robert D. "Trading in Bonds on Line, at Last," The New York Times, Jun. 27, 1999, pp. 1-12.
Hill et al., "Equity Trading, Program Trading, Portfolio Insurance, Computer Trading and All That," Financial Analysts Journal, Jul./Aug. 1988, 10 pages.
Hollington, Simon "Armchair Auctions Set to Replace Market Day," The Independent (London), Jul. 6, 1992, pp. 2-3.
Horowitz, Jed "AZX Tries Again, Hoping New Auction Lures Traders," Investment Dealers' Digest, Jun. 9, 1997, 2 pages.
Hull, John C. "Options, Futures, and Other Derivatives," Third Edition, Prentice-Hall, Upper Saddle River, NJ, 1997, 19 pages.
Hulme, David "Car Auctions by Satellite," Aucnet Inc., Asian Business, Nov. 1994, 1 page.
Hume, Lynn Stevens "Securities Regulation: SEC Proposes Rules to Regulate 'Alternative Trading Systems'," The Bond Buyer, Apr. 17, 1998, pp. 6-7.
Hunter, Robert "The End of the Open Outcry?" Derivatives Strategy, Mar. 1998, pp. 1-8.
Huynh et al., "An Expert Decision-Support System for Option-Based Investment Strategies," Computer Mathematical Application, 1990, vol. 20, No. 9, pp. 1-14.
Hymer, Dian "Strategies for Repeat Home Buyers," Starting Out: The Complete Home Buyer's Guide, Chronicle Books, San Francisco, 1997, 17 pages.
Ingersoll Jr., Jonathan E. "Digital Contracts: Simple Tools for Pricing Complex Derivatives." Journal of Business, 2000, vol. 73, No. 1, pp. 67-88.
Inhaber, Herbert, "How to Solve the Problem of Siting Nuclear Waste", Transactions of the American Nuclear Society, vol. 62, Washington DC, Nov. 11-15, 1990, 4 pages.
International Search report received for PCT International Application Serial No. PCT/US2000/09369, dated Aug. 13, 2001, 10 pages.
International Search report received for PCT International Application Serial No. PCT/US2000/19567, dated Jan. 9, 2001, 3 pages.
International Search report and Written Opinion received for PCT International Application Serial No. PCT/US2004/05911, dated May 1, 2006, 12 pages.
International Search report and Written Opinion received for PCT International Application Serial No. PCT/US2004/40790, dated Apr. 5, 2005, 6 pages.
International Search report and Written Opinion received for PCT International Application Serial No. PCT/US2005/46927, dated Jun. 19, 2006, 9 pages.
International Search report and Written Opinion received for PCT International Application Serial No. PCT/US2004/10028, dated Jun. 23, 2006, 6 pages.
IPE (International Petroleum Exchange), "ETS Workstation User Manual", Sep. 1996, 116 pages.
Ishikida et al., "Implementation of a Combinatorial Market, The Experiments Behind the Automated-Environmental Credit Exchange (ACE)," Economic Science Laboratory, Mar. 1998, pp. 1-29.
Jackson, Ted, "Bloomberg's Next Step: The Instinet Killer?", Electronic Markets, Wall Street & Technology, Aug. 1996, vol. 14, No. 8, 3 pages.
Jacobs et al., "Trading Tactics in an Inefficient Market", Financial Analysis Journal, 1988, 1 page.
Johnson et al., "An Empirical Study of the Impact of Complexity on Participation in Horserace Betting", Journal of Gambling Studies, Summer, 1997, vol. 13, No. 2, pp. 159-172.
Johnson, Sam, "Fix 4.1 Specification Draft is available", FIX Protocol Organization > Discussion Forums, Jan. 28, 1998, pp. 1-5.
Jones, Chris, "Trade'ex Readies Java-Based MarketMaker", Infoworld, Available Online at: <http://www.infoworld.com>, Oct. 28, 1996, 1 page.
Jones, C. M., "Automated Technical Foreign Exchange Trading with High Frequency Data", PhD Dissertation, University of Cambridge, Jun. 1999, 182 pages.
Jouzaitis, Carol, "Tiny Intex Still Awaits Big Break", MARKETSMONDAY, Chicago Tribune, Jul. 13, 1987, 2 pages.
Kallard, Thomas, "Fortune-Building Commodity Spreads", Windsor Books, Brightwaters, NY., 1991, pp. 151 pages.
Kambil et al., "Information Technology, Competition and Market Transformations: Re-engineering the Dutch Flower Auctions", Working Paper Series, Stern #IS-95-1, Jan. 1995, pp. 1-43.
Kansas, Dave, "OptiMark Technologies to Announce Trading System Aimed at Institutions", Wall Street Journal (Eastern edition), Sep. 24, 1996, pp. 1-2.
Kansas, Dave, "OptiMark Technologies to Announce Trading System Aimed at Institutions", The Wall Street Journal, Sep. 24, 1996, 1 page.
Kedrosky, Paul, "Internet Liquidators: www.internetliquidators.com", University of Western Ontario, Ivey Case Studies, Sep. 1997, pp. 1-27.
Keegan, Jeffrey, "BSE Joins State Street in New Bond Trading System", Investment Dealers Digest Inc., Aug. 24, 1998, 2 pages.
Kharouf et al., "A Trading Room with a View", Cover Story Trade Trends, Available online at: <https://www.futuresmag.com/>, Nov. 1998, 6 pages.
Kharouf, Jim, "Exchanges Put on New Game Faces", Available online at: <https://www.futuresmag.com/> Oct. 1998, 5 pages.
Killian et al., "The Effect of Liquidity on Electronic Order Routing", Technological and Competitive Challenges, pp. 67-75.
Klein, Lisa R., "TRADE'ex: The Stock Exchange of the Computer Industry", Harvard Business School Lecture, Sep. 22, 1998, 9-597-019, pp. 1-14.
Klein, Stefan, "Introduction to Electronic Auctions", International Journal of Electronic Markets, vol. 7, No. 4, 1997, 23 pages.
Klemperer, Paul, "Auction Theory: A Guide to the Literature", Forthcoming, Journal of Economic Surveys, vol. 13, No. 3, Jul. 1999, 87 pages.
Knights, Roger, "Auctioning Unsold Airline Tickets", Global Idea Bank, Sep. 1999, pp. 1-2.
Kofman et al., "Spreads, Information Flows and Transparency Across Trading Systems", Applied Financial Economics, vol. 7, Jun. 1, 1997, pp. 281-294.
"Saitori Terminal Screen Display (Example)," Figure III-17, 1 page.
"SBE-MATIF-CME: NSC-VF Project: Client Solution Detailed Specifications," International Monetary Market, Mar. 2, 1998, vE0.08Draft, 119 pages.

(56) References Cited

OTHER PUBLICATIONS

"Schedule of Events," News Releases, IBM Institute for Advanced Commerce, <http://www.Ibm.com/iac/news-980316a.html>, Dec. 26, 1999, 3 pages.
"SEC Approves AZX's Request to Operate Morning Auction," Securities Week, McGraw-Hill Inc., Jun. 10, 1996, vol. 23, No. 23, 1 page.
"Security Pacific Links With INTEX to Automate Money Markets," Securities Week, Aug. 2, 1982, 1 page.
"SIA Technology Show Bucks Down Market: Blue Smoke and Mirrors at Hilton Bash," Trading Systems Technology, Waters Information Services, Inc., Feb. 15, 1988, 4 pages.
"Signs Agreement with Trinitech Systems for Routing of Trades," Press Release, OptiMark Technologies, Inc., Jul. 1, 1997, 2 pages.
"Slim Pickin's at FINCOM: A Vegas Trade Show in NYC," Trading Systems Technology, Waters Information Services, Inc., Jul. 18, 1988, 3 pages.
"Slow but Steady Growth", Global Securities, Banking World Market, 1 page.
"Some Dealers Shunned Electron Bidding at Year-Bill Sale," Dow Jones News Service, Dow Jones & Co. Inc., Apr. 29, 1993, 1 page.
"Son of APT . . . ," LIFFE Supplement, Oct. 1997, 1 page.
"Spring CompCon 87," Computer Society Press, The Computer Society of the IEEE, Feb. 1987, 1 page.
"State Street and the Boston Stock Exchange Announce Exclusive Agreement on State Street's Bond Connect in the United States," Business Wire, Aug. 19, 1998, 3 pages.
"Stock Contingent Trade Facility," General Notice, LIFFE, London, Nov. 6, 1998, No. 1306, 2 pages.
"Stop Loss Placement," Day Trading Home, <http://www.geocities.com/daytradingtutor/trading-stop-loss.htm>, Oct. 8, 2004, 1 page.
"Street Smart: Getting Started," CharlesSwhwab & Co. Inc., Jul. 1994, 30 pages.
"Super Brokers," Wall Street & Technology, vol. 16, No. 8, Aug. 1998, 2 pages.
"Superior Livestock Auction unveils the future of marketing during Cattlemen's Meeting in Phoenix," Business Wire, Jan. 27, 1993, 2 pages.
"Surveillance of CATS Trading," Screenshot, Chicago Mercantile Exchange, Chicago, IL, 4 pages.
"Swiss Exchange SWX: TS User Manual," SWX Trading System, Swiss Exchange SWX, Switzerland, Dec. 31, 1998, vol. 2, No. 1, 249 pages.
"SYCOM III: User Guide," SYCOM, Sydney Futures Exchange, Oct. 1996, 2nd Issue, 135 pages.
"Sydney Futures Exchange Announces Plans to Join GLOBEX," GLOBEX Report, Feb. 10, 1989, vol. II, No. 2, 4 pages.
"Technical Brief: iWay Intelligent Adapter for SWIFT," iWay Software, New York, NY, 3 pages.
"Teleres, Koll-Dove Team Up to Provide On-Line Auction Services," Real Estate Finance & Investment, Institutional Investor, Inc., Nov. 13, 1995, vol. 1, No. 44, 1 page.
"Terminal Key Strokes and Special Keys Will Work as Follows," 1982, 5 pages.
"The 1998 Review of Electronic Transaction Systems in the U.S. Fixed Income Securities Markets," The Bond Market Association, Nov. 1998, 26 pages.
"The Application Program Interface (API) Reference Manual," LIFFE CONNECT, Aug. 17, 1998, v2.6, 91 pages.
"The Application Program Interface (API) Reference Manual," LIFFE CONNECT, Dec. 1998, v3.2, 93 pages.
"The Application Program Interface (API) Reference Manual," LIFFE CONNECT, Jan. 1999, v3.3, 10 pages.
"The Application Program Interface (API) Reference Manual," LIFFE CONNECT, Sep. 1998, v2.7, 91 pages.
"The Application Program Interface (API) Reference Manual," LIFFE CONNECT, Sep. 1998, v3.0, 91 pages.
"The Application Program Interface (API) Reference Manual," LIFFE CONNECT, Sep. 1998, v3.1, 93 pages.
"The Basics of Horseplay," National Thoroughbred Racing Association, <http://www.ntra.com/news.asp?type=playthehorses&id=4795>, Retrieved on Jul. 8, 2003, 2 pages.
"The Complete GLOBEX2 Handbook," Globex2, The Future is Today, Chicago Mercantile Exchange, Jul. 1998, 238, pages.
"The Computer Museum Brings Auction Block to Cyberspace in First Internet Auction,", Business Wire, Inc., Mar. 14, 1994, 2 pages.
"The First Five Years," *CATS, eSPEED et al. v. CBOT, CME*, Defendants' Exhibit 2411, 15 pages.
"The Heyday of the Auction," The Economist Newspaper Ltd., Jul. 24, 1999, <http://www.economist.com/editorial/freeforall/24-7-99/fn8116.html>, 6 pages.
"The International Broker Rises," Global Securities, 1 page.
"The OM CLICK Exchange System: The Marketplace User's Guide," OM CLICK, OM Gruppen, Jan. 1996, Version 12.4, 58 pages.
"The OM CLICK Exchange System: The OM CLICK Exchange Software Product Description," OM CLICK, OM Gruppen AB, Sep. 1996, vol. 12.3-5, 110 pages.
"The OM CLICK Exchange System: The OM System Operator's Guide," OM CLICK, OM Gruppen AB, Sep. 1996, Version 1.5, 198 pages.
"The OM CLICK Trade Installation Guide," OM Gruppen AB, 1998, 20 pages.
"The OM CLICK Trade User's Guide—for Windows NT," OM Gruppen AB, Apr. 1995, Draft Version 1.0-1, 91 pages.
"The OM CLICK Trade: The OM CLICK Trade User's Guide for Windows NT," OM CLICK, OM Gruppen AB, Oct. 1996, vol. 1.2, No. 8, 52 pages.
"The OMnet Application Programmer's Interface Manual," OM Gruppen AB, Jun. 1996, Version 3.3, 5 pages.
"The SWX Platform and Associated Systems,", SWX Swiss Exchange, Nov. 2002, 60 pages.
"Tokyo Stock Exchange 50th Anniversary Materials: System Volume," Tokyo Stock Exchange, Japan, Jul. 31, 2000, 3 pages.
"TradeNow! May 17-21, 1999," May 17, 1999, <http://internettrading.net/tradenow/arch/ex12.shtml>, 2 pages.
"Trading Members on INTEX," INTEX Holdings, 9132-01, 6 pages.
Supplementary European Search Report Received for European Patent Application Serial No. EP00953652.5 dated Mar. 30, 2004, 6 pages.
Moon, Youngme E. "Onsale, Inc. TN.", Harvard Business School Teaching Note 500-022, Aug. 1999, 17 pages.
Moon, Youngme, Onsale, Inc., Harvard Business School Series, 9-599-091, Revised May 1999, pp. 1-17.
Moriarty, George "Regional Roundup—South", Private Equity Week, Jun. 7, 1999, pp. 1.
Morris, John "Contracts are Listed for Bermuda's Exchange", American Banker, Oct. 20, 1981, 4 pages.
Moulds, Warren "Computerized Exchanges: Glimpse of Future?," 1 page.
Munro et al., "A New Way to Purchase Travel", Business Travel News, Issue 158, 1 page.
Munshi, Jamal "Stock Exchange Automation", Garland Publishing, Inc., NY., 1994, 39 pages.
Muranaga et al., "Market Microstructure and Market Liquidity," 1999, 29 pages.
Murray, Brendan "Stockbrokers' New World," Atlanta Business Chronicle, vol. 20, No. 4, 40 pages.
Nelson, Janet "Practical Traveler: Airlines Relaxing Policy on No-Refund Tickets," New York Times, Sep. 22, 1991, 4 pages.
Neo, Boon Siong "The Implementation of an Electronic Market for Pig Trading in Singapore," Journal of Strategic Information Systems, 1992, vol. 1, pp. 278-287.
Neri, Sara "Automated Client Testing within SAXESS," Master's Thesis, Swedish Royal Institute of Technology, TRITA-NA-E02104, pp. 1-43.
New York Mercantile Exchange, "Additional Material in Support of Jan. 23, 1992 NYMEX ACCESS Submission," Letter to Commissioners, Aug. 20, 1992, 47 pages.

(56) References Cited

OTHER PUBLICATIONS

New York Mercantile Exchange, FOIA Confidential Treatment Request for Material Pertaining to NYMEX ACCESS: Letter to Edward M. Colbert, Esq., May 5, 1992, 2 pages.
New York Mercantile Exchange, "NYMEX ACCESS," Letter to John Lawton, May 5, 1992, 1 page.
New York Mercantile Exchange, "NYMEX Submission #99-45: Proposed New Version of NYMEX ACCESS Proposed New Chapter 11A, Proposed New NYMEX Rule 6.56A and Proposed Amendments to NYMEX Rules 2.22, 2.43, 3.46, 5.01, 6.19, 6.25, 6.26, 6.27, 6.31, 6.32, 6.40A, 6.41, 6.56, 8.00, 8.58 and 10.02—Submitted Pursuant to Regulations§§ 1.41(b) and 1.41(c)," Letter to Commissioners of CFTC, Jul. 14, 1999, 152 pages.
Niederhoffer et al., "Market Index Futures Contracts," Appendix G, Financial Analysts Journal, Jan./Feb. 1980, 9 pages.
Niemeyer, Jonas "Essays on Market Microstructure—Empirical Evidence from Some Nordic Exchanges" PhD Dissertation Stockholm School of Economics , 1994, pp. 180 pages.
Niemeyer et al., "An Empirical Analysis of the Trading Structure at the Stockholm Stock Exchange," Stockholm School of Economics working paper, No. 44, Jan. 1995, 38 pages.
Nigel et al., "Managing International Assets: Key Trends in Allocation Risk, Analysis and Custody," Economist Intelligence Unit, vol. 103, 1993, pp. 1-2.
Nix et al., "The Dow Jones-Irwin Guide to International Securities, Futures, and Options Markets," Dow Jones-Irwin, IL., 1988, 198 pages.
Noack, David "First Stop for Some Lies In Cyberspace," The Record, Feb. 19, 1995, 6 pages.
Nomani Sr., A. "Public May Submit Bids to Get Bargain Rates," Wall Street Journal, Aug. 1, 1989, 2 pages.
Nomani, Asra Q. "Airline Industry Cutting More Fares for Fall Vacations," The Wall Street Journal, Aug. 21, 1991, 3 pages.
Norden, Lars "Daily Distribution of Swedish OMX-Index Returns over Intraday-to-Intraday Time Intervals," Finnish Economic Papers, vol. 7, No. 1, Spring 1994, 14 pages.
Nusbaum, David "DRW Chooses the Overnight Option," Futures, vol. 23, No. 2, Feb. 1994, 2 pages.
Nusbaum, David "Paying for Quotes; Controversies Regarding Stock Price Quote Information Selling," Futures, vol. 24, No. 12, Nov. 1995, 7 pages.
Nusbaum, David "Where No. Trading System has Gone Before", Futures, vol. 21, No. 9, Jul. 1992, 7 pages.
Nyberg, Bartell "Sale at Video Auction a Record but Prices Hurt by Chicago Probe", Denver Post, Jan. 20, 1989, 1 page.
Ocrant, Michael "CME Board Set to Consider Initiatives to Boost Lagging Currency Sector at December Meeting," Securities Week, vol. 28, No. 4, Nov. 27, 1995, 2 pages.
Oesterle, Dale A. "The SEC's Assault on Electronic Trading," Regulation, vol. 21, No. 3, Summer 1998, 10 pages.
Office of Communication and Education Services, "CFTC Approves NYMEX ACCESS System," News Release, CFTC, Washington D.C., No. 3606-92, Dec. 17, 1992, 2 pages.
Ogura, Masao "Here Comes the Little Guys," Tokyo Business, Feb. 1995, 8 pages.
Okoroji, Eleanya A. "Automated Stock Option Trading," Southern U Master's Thesis, May 1988, 72 pages.
Oppenheim, Eve "G-183 Electronic Trading System: Which, Why, Where," Business Communications Company, Inc., 1998, 10 pages.
Orford, James "Trading on the Frontier," Plan Sponsor, Oct. 1996, 9 pages.
O'Sullivan, Orla "Auctions to be Computer-Orchestrated," National Mortgage News, Mar. 14, 1994, 2 pages.
O'Toole, Edward T. "Surge in Financial Futures is Only the Beginning", Dollar, The International Journal of American Investments, May 1982, 5 pages.
Owen, Guillermo "Pari Mutuel as a System of Aggregation of Information," Game Theoretical Applications to Economics and Operations Research, 1997, 13 pages.

Parameswaran et al., "Electronic Markets and the Logistics of Digital Products", 1st LAC Workshop on Internet Based Negotiation Technologies, Mar. 8-19, 1999, 16 pages.
Parkes, David C. "iBundle: An Efficient Ascending Price Bundle Auction," E-commerce, vol. 99, 1999, 10 pages.
Parlour, Christine A. "Price Dynamics in Limit Order Markets," Oxford University Press, vol. 11, No. 4, Winter 1998, pp. 789-816.
Pavel et al., "Globalization in the Financial Services Industry," Federal Reserve Bank of Chicago, Economic Perspectives, 16 pages.
Peake, J.W. "Coordination & Communications Policy," Memorandum to INTEX Personnel, Dec. 6, 1982, 2 pages.
Peake, Junius W. "The Last Fifteen Meters A: Discussion of Some System Requirements for a Modern Computer Based Trading Facility", Automation In the Futures Industry Conference, Appendix E, Jun. 15, 1977, 18 pages.
Peel et al., "Product Bundling and a Rule of Thumb Versus the Harvill Formulae: Can Each Way Bets with UK Bookmakers Generate Abnormal Returns," Applied Economics, vol. 32, 2000, 8 pages.
Pelline, Jeff "Travelers Bidding on Airline Tickets SF Firm Offers Chance for Cut-Rate Fares," San Francisco Chronicle, Aug. 19, 1991, 3 pages.
Peltz, Michael "Instinct's Identity Crisis," Institutional Investor, Nov. 1995, pp. 53.
Penrose, Paul "Breathing Liffe into Futures," Banking Technology, Apr. 1989, 2 pages.
Perell, Williams "Electronic Market: The Chance to Haggle by Computer," Tecnología informática, 1990, 2 pages.
Perrakis et al., "Option Pricing and Replication with Transaction Costs and Dividends," Fame Research Paper, No. 8, 58 pages.
Phatarfod, Ravi "Betting Strategies in Horse Races," Asia-Pacific Journal of Operational Research, vol. 16, 1999, 12 pages.
Piantoni et al., "Implementing the Swiss Exchange Trading System," SWX Swiss Exchange, IEEE, 5 pages.
Pirrong, Craig "A Trading Primer. (Explanations of Trading in Futures, Options and in stocks)," Regulation, Fall, vol. 22, No. 4, 1999, 1 page.
Piton, Margaret "New Service Gives Access to a Choice of Airline Fares," The Globe and Mail, Sep. 21, 1991, Article 85, 2 pages.
Plott, Charles R. "Symposiums: Market Architectures Institutional Landscapes and Testbed Experiments Introduction", Economic Theory, vol. 4, No. 1, Jan. 1994, 9 pages.
Polk, Charles W. "Electricity Trading: Resolving the Electricity Paradox," Global Energy Business, Sep./Oct. 2001, 5 pages.
Porter et al., "Trading In a Pure Exchange Economy without an Auctioneer : An Experimental Approach," CalTech Social Science Working Paper, Mar. 1993, 49 pages.
Power, Carol "State Street to Launch Automated Bond Trading System," American Banker, vol. 163, No. 102, Jun. 1, 1998, pp. 23.
Powers et al., "Inside the Financial Futures Market," 3rd Ed., 1991, John Wiley & Sons, NY, 390 pages.
Pyne, Charles F., Letter to Junius W. Peake of Triangle Associates, Oct. 31, 1980, 3 pages.
Quiddington, Peter "Fish Markets Plan Auctions On-Line," Sydney Morning Herald, Mar. 28, 1988, pp. 4.
Rachlevsky-Reich, Benny "GEM: A Global Electronic Market System," Master's Thesis, Israel Tech, Jul. 1999, pp. 1-125.
Ray, Christina I. "The Bond Market: Trading and Risk Management", Homewood, IL, 1993, 13 pages.
Record Volume on ITG Trading Desk, ITG Connect, Spring, 1996, 3 pages.
Reed, Dan "Airlines Go on Line to Cut Costs: Carriers Try to Fill More Seats, Lower Ticketing Expenses," The Fort Worth Star-Telegram, Apr. 13, 1996, pp. 2-4.
Remolona, Eli M. "The Recent Growth of Financial Derivative Markets," FRBNY Quarterly Review, Winter 1992-1993, pp. 28-43.
Resnick et al., "Roles for Electronic Brokers." MIT, 1997, pp. 1-11.
Rhoda et. al., "Risk Preferences and Information Flows in Racetrack Betting Markets," Journal of Financial Research, vol. XXII, No. 3, Fall 1999, pp. 265-285.
Rockoff et. al., "Design of an Internet-Based System for Remote Dutch Auctions," Internet Research, vol. 5, No. 4, 1995, pp. 10-16.

(56) References Cited

OTHER PUBLICATIONS

Rohrer, Julie "Steve Wunsch's Uphill Battle," Institutional Investor, Dec. 1988, 4 pages.
Rosenberg, Joshua Pricing Multivariate Contingent Claims Using Estimated Risk-Neutral Density Functions, NYU Working Paper Series, FIN-96-36, 1996, 24 pages.
Rosenblatt, Robert A. "New Treasury Auction System is Criticized Securities," Los Angeles Times, Apr. 29, 1993, pp. 2.
Rosenthal, Mindy "Electronic Mortgage and Asset-Backed Trading System Nears Launch, " BondWeek, vol. 11, No. 18, May 6, 1991, pp. 2.
Rubino et al., "High Tech Comes to the Tulip Bed," May 12, 1986, Business Week, pp. 72D.
Ruby, Dan "Lone Wolf," Nextworld, Winter 1992, 1 page.
Rust et al., "Behavior of Trading Automata in a Computerized Double Auction Market," The Double Auction Market, 1993, pp. 155-198.
Sales, Robert "Alliance threatens LIFFE's open outcry," Wall Street & Technology, May 1998, vol. 16, No. 5, pp. 4.
Sales, Robert "Broker/dealers break bread with ECNs," Wall Street & Technology, Mar. 1999, vol. 17, No. 3, pp. 3.
Sales, Robert "Nasdaq ECNs: A Brave New World," Wall Street & Technology, vol. 16, No. 8, Aug. 1998, pp. 3.
Sales, Robert "SEC to Wall Street . . . Play Fair with the Little Guy," Wall Street & Technology, vol. 15, No. 1, 7 pages.
Sales, Robert "Two Trading Roads Diverge," Wall Street & Technology, Jun. 1998, vol. 16, No. 6, pp. 4.
Sammer, Harald W. "Online Stock Trading Systems: Study of an Application," IEEE Spring Compcon 1987, pp. 161-162.
Samuel, Sarah "An Analysis of Factors Critical to the Success of Financial Futures Contracts," Concordia University Master's Thesis, Aug. 1994, pp. 1-99.
Sanders et al., "Auctioning by Satellite using Trusted Third Party Security Services," Information Security-the Next Decade, Chapman & Hall, N Y., 1995, pp. 203-219.
Sarkar et al., "Electronic Trading on Futures Exchanges," FRBNY: Current Issues in Economics and Finance, vol. 4. No. 1, Jan. 1998, pp. 1-6.
Sarles, Judy "Despite Dotcom Downturn, 5th Market's Nieboer Sees Bright Future," Nashville Business Journal, vol. 16, No. 52, Dec. 22, 2000, 2 pages.
Sarles, Judy "High-Tech Trader Lands $1M in Financing," Nashville Business Journal, vol. 15, No. 35, Aug. 27, 1999, 2 pages.
Satterthwaite, et al., "Bilateral Trade with the Sealed Bid k-Double Auction: Existence and Efficiency," Journal of Economic Theory, vol. 48, 1989, pp. 107-133.
Sauer, Raymond D. "The Economics of Wagering Markets," Journal of Economic Literature, vol. 36, No. 4, Dec. 1998, pp. 2021-2064.
Savage, Sam L. "Prices, Probabilities and Predictions," Operations Research Management Science Today, Jun. 2004, pp. 1-10.
Sawyers, Arlena "Minority Dealer Ranks, and Profits, are Rising," Automotive News, Feb. 1994, pp. 52.
Schellhorn, Henry "Combination Trading with Limit Orders", Journal of Applied Mathematics & Decision Sciences, 1997, vol. 1, No. 2, pp. 133-150.
Schmerken, Ivy "Canadian Brokerage Hedges with On-Line Expertise," Wall Street Computer Review, Dec. 1990, 3 pages.
Schmerken, Ivy "How Computer Assisted Trading is Making the Toronto Stock Exchange Purr," Wall Street Computer Review, Dec. 1987, pp. 71-79.
Schmerken, Ivy "Maverick Leader Manages Global Risk," Wall Street Computer Review, vol. 8, No. 11, Aug. 1991, pp. 22.
Schmerken, Ivy "O'Connor Lifts the Cover," Wall Street Computer Review, vol. 9, No. 1, Oct. 1991, pp. 38.
Schmerken, Ivy "Oh What Memories!" Wall Street & Technology, Jun. 2002, pp. 1-5.
Schmerken, Ivy "Staying in the Middle: . . . Brokers are Fighting to Keep their Role in the Market; Includes Related Article on Crossing Networks," Wall Street Computer Review, vol. 9, Dec. 1991, 8 pages.
Schmerken, Ivy "The Bulls and Bears Come Out at Night: Electronic Trading," Wall Street Computer Review, vol. 7, No. 12, Sep. 1990, 10 pages.
"1998 Guide to Computerized Trading," Futures, p. 30.
"A Correction," The Bond Buyer, The Bond Buyer, Inc., Nov. 27, 1996, 1 page.
"A Glossary of Financial Futures Terms," Dollar, 1 page.
"A Trader's Guide to INTEX," The International Futures Exchange (Bermuda) Ltd., Hamilton, Bermuda, 10 pages.
"A.P.T. Traders Course Summary Booklet," A.P.T. Module, LIFFE, Apr. 1994, 8 pages.
"ACCESS Functional Specification—Trading Floor," NYMEX ACCESS, Oct. 9, 1991, 32 pages.
"Access Functional Specifications Clearing Systems," Appendices I-V, v1, New York Mercantile Exchange, Oct. 10, 1991, pp. III-3-III-18.
"ACCESS," PowerPoint Presentation, New York Mercantile Exchange, 16 pages.
"And to Think It All Began on a Napkin!," Overview, Bid.com, Retrieved on Dec. 8, 1999, 1 page.
"Annual Report 1989," The Tokyo International Financial Futures Exchange, Cover Front Page, 1 page.
"Appendix 2 to CFTC Submission: Proposed Rules, Rule Amendments and User Agreement for Implementation of NYMEX ACCESS," New York Mercantile Exchange, Jan. 23, 1992, 138 pages.
"Appendix C: Click Trading," 5 pages.
"Appendix K: The Computer Vendors," 1 page.
"Appendix B: Trading Technologies", 19 pages.
"Application KIT: Rules and Terminology at a Glance," NYMEX ACCESS, New York Mercantile Exchange, 71 pages.
"APT Trading Procedures (ATOM Version)," The London International Financial Futures Exchange, Mar. 28, 1991, 33 pages.
"APT User Guide," LIFFE, Jan. 1994, 102 pages.
"Apt: A Trading System for the Future," LIFFE, 5 pages.
"APTplus Trading Procedures," Attachment to General Notice No. 788, Dec. 28, 1995, 45 pages.
"APTplus User Guide," LIFFE, Nov. 1995, v1.1 Draft, 208 pages.
"APTplus User Guide," The London International Financial Futures and Options Exchange, Nov. 1995, Version 1.1 draft, 75 pages.
"Arizona Stock Exchange Opportunity Knocks," The Arizona Republic—Final Chaser, Phoenix Newspapers, Inc., Nov. 22, 1991, 2 pages.
"Arizona Stock Exchange: Skeptics are Forgiven," The Phoenix Gazette, Phoenix Newspapers, Inc., Apr. 1, 1996, pp. 2-4.
"At Dead Line: AZX Alliance," Traders Magazine, OneSource Information Services, Inc., Mar. 1, 1999, 1 page.
"At Dead Line: Listed on AZX," Traders Magazine, OneSource Information Services, Inc., Mar. 1, 1999, 1 page.
"AT&T Develop 'Paperless' Computerised Auction System for National Car Auctions," M2 Presswire, M2 Communications Ltd., Mar. 13, 1996 and Mar. 13, 1997, 2 pages.
"Attention Business Editors: Bank of Montreal Endorses Secure Credit Card Transactions On-line," Canada NewsWire, Canada NewsWire Ltd., Apr. 18, 1996, p. 2.
"Auction Block for Va. Lambs is a Computer," The Washington Post, Mar. 23, 1989, p. 1.
"Auctionnet Grows Rapidly in Its First Year," Automotive News Advertorial, Crain Communications, Inc., Sep. 23, 1991, 2 pages.
"AURORA: The Most Technologically Advanced Trading System Available Today," AURORA, Chicago Board of Trade, Chicago, IL., 1990, 11 pages.
"Automated Auctions: GAO Questions Benefits of System," Dow Jones News Service, Dow Jones & Co., Inc., Apr. 28, 1993, pp. 1.
"Automated Trading Systems," Appendix C, 5 pages.
"Automated Trading Works: Now for the Next Hurdle," Futures World, Nov. 22, 1984, 3 pages.
"Bank of New York to Buy Bondnet Brokerage Assets," Securities Week, The McGraw-Hill Companies, Inc., Sep. 1, 1997, vol. 24, No. 35, 2 pages.
"Banks Battle Credit Card Hackers," Canadian Press Newswire, Micromedia Ltd., May 31, 1996, pp. 2-3.

(56) References Cited

OTHER PUBLICATIONS

"Barbarians at the Gate: Electronic Trading Systems are Proliferating South of the Border," Canadian Investment Review, Micromedia Ltd., Sep. 1994, vol. 7, No. 3, 9 pages.
"Beatrice Feeder-Pig Sales Beamed Up to Satellite," The Omaha World-Herald, Omaha World-Herald Company, Aug. 29, 1994, 2 pages.
"Best Execution and Interpositioning," NASD Manual & Notices to Members, National Association of Securities Dealers, Inc., 1998, pp. 1-2.
"Bet of the day," England, 1 page.
"Black-box Global Trading a Challenge to Regulators," Globex Electronic Trading System, American Banker, The Gale Group, Jun. 23, 1992, vol. 157, No. 120, 2 pages.
"Bond Auction by Computer: Satisfied Major Traders," The Wall Street Journal, Jul. 18, 1990, 1 page.
"BondNet Adds Emerging Markets Debt," Securities Week, McGraw-Hill Inc., Sep. 16, 1996, vol. 23, No. 37, 1 page.
"BondNet Launches Emerging Markets Debt Product," PR Newswire, PR Newswire Association, Inc., Sep. 11, 1996, 2 pages.
"BondNet to Introduce Automated Trading System for Corporate Bond Traders," Securities Week, McGraw-Hill Inc., May 1, 1995, vol. 22, No. 18, 2 pages.
"Bookit Airfare Bidding System (Fax for Your Plane Ticket?)," Consumer Reports Travel Letter, Consumers Union of U.S., Inc., vol. 7, No. 9, 2 pages.
"Brief Transmission: Bank Comes Internet Credit Card Aware," Telecomworldwire, M2 Communications Ltd., Apr. 29, 1996, 1 page.
"Broker Workstation," Chicago Board of Trade, Chicago, IL, 1990, 6 pages.
"Buyside Sees Need to Upgrade Crossing Nets," Wall Street Letter, Institutional Investor, Inc., Nov. 1, 1993, vol. XXV, No. 43, 1 page.
"Canada's Internet Liquidators International Inc. Expands Online Auction With Opening of U.S. Subsidiary In Tampa," Canada NewsWire, Jun. 26, 1996, 1 page.
"Canadian Quantex—User Manual," RBC Dominion Securities, Inc., Version 1.1, Quantitative Integrated Trading Technologies, Inc., Toronto, ON, Canada, 115 pages.
Markoff, John, "Can Xerox Auction Off Hot Air?", The New York Times, Jun. 24, 1996, Section D, col. 1, Business Financial Desk, pp. 2-4.
Markoff, John, "Spawning a New Way to Buy Time", Sydney Morning Herald, May 8, 1989, pp. 1-2.
Marshall, Martin, "Instinet Adopts Enterprise JavaBeans Strategy", Informationweek, No. 741, Jun. 28, 1999, pp. 1-4.
Maskery, Mary, Ann, "Going, Going, Gone", Automotive News, Nov. 26, 1990, 2 pages.
Massimb et al., "Electronic Trading, Market Structure and Liquidity", Financial Analysts Journal, vol. 50, No. 4, Jan./Feb. 1994, pp. 21-39.
Matthew, Janet, "OTC Success Spurs Specialized Trading Systems", Wall Street Computer Review, Sep. 1989, 7 pages.
Maynard, Therese H., "What is an Exchange?—Proprietary Electronic Securities Trading Systems and the Statutory Definition of an Exchange", Washington and Lee Law Review, Summer, vol. 49, No. 3, 1992, pp. 833-912.
Mazzella, Donald P., "Workstations for Financial Services Professionals", Wall Street Computer Review, May 1986, 6 pages.
Mcafee et al., "Auctions and Bidding", Journal of Economic Literature, American Economic Association, vol. 25, No. 2, Jun. 1987, pp. 699-738.
Mccabe et al., "Institutional Design for Electronic Trading", Technological and Competitive Challenges, 1995, pp. 121-156.
Mccabe et al., "Smart Computer-Assisted Markets", Science, 1991, pp. 1-9.
Mccausland, Bob, "Addendum to 4.1 Spec.", Letter and agreement to Larry Gomes, Feb. 5, 1992, 16 pages.
Mccausland, Bob, "Current Bugs", Letter to Larry Gomes, Apr. 12, 1991, 1 page.

Mccausland, Bob, "Current Bugs", Letter to Larry Gomes, Apr. 22, 1991, 1 page.
Mccausland, Bob, "Detail of computation of net price on Executions", Letter to Mike Pires, Apr. 19, 1991, 2 pages.
Mccausland, Bob, "Dollar Pricing", Letter to Larry Gomes, Apr. 5, 1991, 2 pages.
Mccausland, Bob, "Follow to our Conversation Yesterday", Letter to Mike Pires, Apr. 24, 1991, 1 page.
Mccausland, Bob, "Net price field on coupon W.I. trades", Letter to Larry Gomes, Jun. 13, 1991, 1 page.
Mccausland, Bob, "New Order Management", Letter to Larry Gomes, Jul. 15, 1991, 3 pages.
Mccausland, Bob, "Revisions to the method of making market SUBJECT", Letter to Larry Gomes, May 30, 1991, 1 page.
Mccausland, Bob, "Software Changes", Letter to Larry Gomes, Mar. 6, 1991, 2 pages.
Mccausland, Bob "System Enhancements and Features," Letter to Larry Gomes, Jul. 18, 1991, 8 pages.
Mccausland, Bob "System Software Changes," Letter to Larry Gomes, Oct. 16, 1990, 2 pages.
Mccausland, Bob "Trading with Corp. Execution Reporting," Letter to Larry Gomes, Jun. 12, 1991, 1 page.
Mccausland, R. "Software Modification," Letter to Larry Gomes, Apr. 3, 1991, 2 pages.
Mcgookins, Stephen "Media Futures: Cyber sightings", Financial Times (London), Oct. 30, 1995, pp. 2-3.
Mcinish et al., "Hidden Limit Orders on the NYSE," Journal of Portfolio Management, Spring, 1995, pp. 19-26.
Mcmillan, John "Selling Spectrum Rights," Journal of Economic Perspectives, Summer, 1994, vol. 8, No. 3, pp. 145-162.
Meissner, Frank, "Centralized Electronic Marketing Systems Improve Trading of Agricultural Commodities," Marketing News, 1 page.
Melamed, Leo " The Mechanics of a Commodity Futures Exchange: A Critique of Automation of the Transaction Process," Hofstra Law Review, vol. 6, No. 1, Fall 1977, pp. 149-172.
Mencke, Claire "Finding the Lowest-Cost Path for Stock Trading," Investor's Business Daily, May 1, 1996, pp. 1-3.
Mendelson et al., "The ABCs of Trading on a National Market System," Financial Analysts Journal, Sep./Oct. 1979, 11 pages.
Metcalfe, Rod "Cattle Sale on Videotape," Australian Financial Review, Mar. 22, 1985, 1 page.
Michaels, George "Software Review: Computerized Basket Execution System," Wall Street Computer Review, Aug. 1991, 2 pages.
Michaels, Jenna "Customized listed Contracts," Wall Street & Technology, vol. 10, No. 10, May 1993, 2 pages.
Michaels, Jenna "Is the Pen Mightier than the Phone?" Wall Street Computer Review, vol. 8, No. 12, 2 pages.
Micioni, Peter "Strategies for International Trading," Morgan Stanley & Co, Global Equity Derivatives Publication, pp. 43-79.
Milgrom et al., "A Theory of Auctions and Competitive Bidding," Econometrica, vol. 50, No. 5, Sep. 1982, pp. 1089-1122.
Milgrom, Paul "Auctions and Bidding: A Primer," Journal of Economic Perspectives, vol. 3, No. 3, Summer, 1989, pp. 3-22.
Miller, Greg "Celebrity Auctions are Going, Going . . . Online," Los Angeles Times, May 13, 1996, pp. 1-2.
Miller, Merton H. "Financial Innovations and Market Volatility", 295 pages.
Miller, Merton H. Financial Innovations and Market Volatility, Chapter 11, Blackwell, MA., 1991, 7 pages.
Miller, Ross M. "Smart Market Mechanisms: From Practice to Theory," Journal of Economics and Control, 1996, vol. 20, pp. 967-978.
Miller, Ross M. "The Design of Decentralized Auction Mechanisms That Coordinate Continuous Trade in Synthetic Securities", Journal of Economic Dynamics and Control, 1990, pp. 237-253.
Miniclier, Kit "Livestock Buyers to Put $50 Million on the Line," Denver Post, Jan. 9, 1994, 1 page.
Mitchell, Constance "Big Junk Bond—Players to Try Weekly Auctions," Wall Street Journal, Jun. 14, 1990, 2 pages.
Mitchell, Russel "How GE is Electrifying the Auto-Auction Business," Business Week, May 16, 1988, pp. 1-3.

(56) References Cited

OTHER PUBLICATIONS

Mitchener, Randon "On Election Bourse, Race is Wide Open German Contest Remains Close for Buyers of Political 'Shares'," International Herald Tribune, Oct. 13, 1994, pp. 1-2.
Monsen, Laura "Using Microsoft Excel 97: Clear Concise Dependable," pp. 305-337.
Montgomery, Johnnye "MooTV: Airwave Auction Technology Transforms A Decades-Old Tradition," Dallas Morning News, Jan. 6, 1991, pp. 1-3.
Schmerken, Ivy "The Power of ONE," Wall Street & Technology, vol. 11, No. 7, Dec. 1993, pp. 46.
Schmerken, Ivy "Wall Street's Quiet Revolution," Wall Street & Technology, vol. 9, No. 10, Jun. 1992, pp. 25.
Schmerken, Ivy "What's Next on Wall Street's Automation Agenda?" Wall Street Computer Review, vol. 6, No. 7, Apr. 1989, pp. 44.
Schroeder, Mary "An Insider's Guide," Securities Industry News, Jan. 17, 2000, 16 pages.
Schwartz et al., "Next-Generation Securities Market Systems: An Experimental Investigation of Quote-Driven and Order-Driven Trading," Journal of Management Information Systems, vol. 14, No. 2., Fall 1997, pp. 47-62.
Schwartz, Robert A. "Equity Markets: Structure, Trading, and Performance," Harper & Row, 1988, NY., 289 pages.
Search and Examination Report under Sections 17 and 18(3) received for British Patent Application Serial No. 0320232.2, dated Dec. 17, 2003, 6 pages.
Searles, Denis M. "No Need to Hoof it to Video Cattle Auction Satellite Technology from Colorado Firm Connects Buyer, Seller," Rocky Mountain News, Apr. 30, 1993, pp. 1-2.
Segev et al., "Brokering Strategies in Electronic Commerce Markets," E-commerce, 1999, pp. 167-176.
Selby et al., "Steve Wunsch's Wall Street Southwest," Institutional Investor, Feb. 1992, pp. 2.
Shahan, Catherine "Public Television Station Holds On-Line Computer Auction," United Press International, Feb. 11, 1987, pp. 2-3.
Sheppard, Robert "Western Cattle Make Star Trek to Help Bridge Regional Gap," The Globe and Mail, Oct. 29, 1983, pp. 1-2.
Shin, Hyun Song "Measuring the Incidence of Insider Trading In a Market for State-Contingent Claims," The Economic Journal, vol. 103, Issue 420, Sep. 1993, 14 pages.
Shin, Hyun Song "Optimal Betting Odds Against Insider Traders," The Economic Journal, vol. 101, Issue 408, Sep. 1991, 8 pages.
Sinclair, Joseph T., "eBay the Smart Way: Selling, Buying, and Profitting on the Web's #1 Auction Site," American Management Association, NY, pp. 2-11.
Sinquefield et al., "Trading Illiquid Stocks," Measuring Liquidity, pp. 211-222.
Sirri, Erik R. "Jefferies & Company: ITG," Harvard Business School lecture, 9-294-052, Nov. 1, 1993, pp. 1-24.
Slutsky et al., The Guide to Electronic Futures Trading, 2000, McGraw-Hill, NY., pp. ix-200.
Smith, Carrie R. "Futures Exchanges Go for Global Links, " Wall Street & Technology, vol. 12, No. 13, May 1995, pp. 20-24.
Smith, Courtney "Futures Spread Trading: The Complete Guide," Traders Press, Greenville, SC, 2000, 152 pages.
Smith, Terry "The Good, the Bad and the Ugly," Management Today, Sep. 1995, pp. 54-60.
Spehar, George M. "Electronic Trading on the Exchanges," The Advent of Program Trading, pp. 161-169.
Steiert et al., "JPMQ—An Advanced Persistent Message Queuing Service," Department of Computer Science, University of Kaiserslautern, 18 pages.
Stirland, Sarah "News and Trends: Why Not Use the Phone? Dealers Yawn at Cyber-Trading," Bond Buyer, Nov. 20, 1996, pp. 34.
Stoll et al., "Futures and Options: Theory and Applications," South-Western, Cincinnati, 1993, pp. v-418.
Stucki et al., "Stock and option markets: The Swiss evidence," Journal of Banking & Finance, vol. 18, 1994, pp. 881-893.

Sturm, Fletcher J. "Trading Natural Gas: Cash, Futures, Options and Swaps," PennWell, Tulsa, 1997, 112 pages.
Stutz, Bruce "Fishport's Bait Nets a Loss," Newsday, Feb. 2, 1990, 2 pages.
Sviokla et al., "AUCNET: Teaching Note," Harvard Business School lecture, 5-396-280, Feb. 21, 1997, 25 pages.
Sycom III User Guide, Oct. 1996, 409 pages.
Szabo, Nick, "Smart Contracts," 1994, 8 pages.
Taleb, Nassim "Dynamic Hedging: Managing Vanilla and Exotic Options", John Wiley & Sons, NY., 1997, 270 pages.
Taylor, John "Selling Without the Smelling Televised Auction will Sell About 25,000 Head of Cattle," Omaha World-Herald, Mar. 23, 1988, pp. 1-2.
Terrell et al., "Optimal Betting and Efficiency in Parimutuel Betting Markets with Information Costs," Economic Journal, vol. 106, No. 437, Jul. 1996, 17 pages.
The division of trading and Markets, "Memorandum of New York Mercantile Exchange's Proposal to Implement the NYMEX ACCESS," Dec. 7, 1992, CTFC.
"The Over-The-Counter Market," The Equity Markets Today, pp. 47-62.
Tomasula, Dean "Winds of Change Blowing Across CBOE Trading Floor," Wall Street & Technology, vol. 13, No. 13, Dec. 1995, 4 pages.
Tomasula, Dean "Swedish Trading Systems Come out of the Cold," Wall Street & Technology, vol. 14, No. 1, pp. 24-26.
Tomkins, Richard "Passengers Take a Seat at the International Auction," Financial Times (London), Jun. 17, 1996, pp. 21.
Toner, Ann "Hogs Sold in High-Tech Market Bidders Linked Through Satellite," Omaha World-Herald, Sep. 11, 1994, pp. 3M.
Tsang, Raymond "Open Outcry and Electronic Trading in Futures Exchanges," Bank of Canada Review, Spring 1999, pp. 22-39.
Ulibarri, Carlos A. "Is After-Hours Trading Informative?" Journal of Futures Markets, vol. 18, No. 5, 1998, pp. 563-579.
Umlauf, Steven R. "Information Asymmetries and Security Market Design," Journal of Finance, vol. 46, No. 3, Jul. 1991, pp. 929-953.
US securities and exchange commission, "Chicago Match," Letter to George T. Simon, Esq. of Foley & Lardner, Nov. 30, 1994, 20 pages.
Van Heck et al., "Experiences with Electronic Auctions in the Dutch Flower Industry," Electronic Markets, vol. 7, No. 4, 1997, pp. 29-34.
Varian, Hal R. "Economic Mechanism Design for Computerized Agents," 1st USENIX Workshop on Electronic Commerce, Jul. 11-12, 1995, pp. 13-21.
Virga, Charles J. "Comp/Mkt. Team Functional Specifications," NYMEX Information Services, Aug. 6, 1992, vol. 4.2, 47 pages.
Wagner, Wayne "Broker to Floor," pp. 79-90.
Wagner, Wayne H. "Buttonwood II: Considering Alternative Market Structures," Financial Analysts Journal, Nov.-Dec. 1987, pp. 359-372.
Wagner, Wayne H. "The Complete Guide to Securities Transactions", Enhancing Investment Performance and Controlling Costs, John Wiley & Sons, NY., 1989, pp. 279-290.
"Mesa: User's Guide," vBeta, Athena Design, Inc., Boston MA, Jul. 1992, 111 pages.
"Mesirow 'Black Box' Integrates Order Routing on ADP T.1 Network," Wall Street Network News, May 7, 1993, 3 pages.
"Mobile Phone Licenses on Sale Today High-stakes Auction Will Use Computers to Determine Players for Next Generation," Associated Press, Rocky Mountain News, Dec. 5, 1994, 2 pages.
"Morgan's New Digs: A High-Tech Vision Goes Live," Wall Street & Technology, Aug. 1996, vol. 14, No. 8, 2 pages.
"New Contracts on GLOBEX," Securities Week, McGraw-Hill Inc., Aug. 17, 1992, 1 page.
"New System Allows Customers to Execute Orders on Major Exchanges with Click of a Mouse," Securities Week, McGraw-Hill Inc., Dec. 18, 1995, vol. 22, No. 51, 1 page.
"New Wave of Communications Attracts High Bidding at Auction," The Fort Worth Star-Telegram, Jul. 26, 1994, 2 pages.
"New York Mercantile Exchange American Computerized Commodity Exchange System and Services," NYMEX Access, New York Mercantile Exchange, NY., Jan. 23, 1992, 338 pages.

(56) References Cited

OTHER PUBLICATIONS

"Nikko N.Y. Taps Davidge, SUN for Equities Trading Systems," Trading Systems Technology, Waters Information Services, Inc., Apr. 20, 1992, 2 pages.
"NYMEX ACCESS System 2000: Functionality Prioritization," Apr. 15, 1997, 5 pages.
"NYMEX ACCESS: Customer Information and Risk Disclosure Statement," New York Mercantile Exchange, 8 Pages.
"NYMEX ACCESS: Documentation Manual," New York Mercantile Exchange, Jun. 1999, 235 Pages.
"NYSAC Says New Rule Will Make Its Auction More Flexible," Wall Street Letter, Institutional Investor, Inc., Aug. 13, 1990, vol. XXII, No. 32, 1 Page.
"OM Click Trade User's Guide for Windows NT," OM Gruppen AB, Oct. 1998, v15.2-15.3, 80 pages.
"Online Commerce Gets a Boost from Big Banks," Canadian Business and Current Affairs Marketing Magazine, Micromedia Ltd., May 13, 1996, vol. 101, No. 19, 1 page.
"ONSALE Brings Thrill of Auctions and Bargain Hunting Online," Business Wire, May 22, 1995, 3 pages.
"Open All Hours: Futures Exchanges," The Economist, Nov. 6, 1993, vol. 329, No. 7836, 3 pages.
"Open for Business," Golden Age Antiques and Collectibles Online Auction, <http://www.goldnage.com>. 1 page.
"Option Contract on FTSE 100 Index," LIFFE, London, Jun. 4, 1999, General Notice, No. 1431. 3 pages.
"Orders and Requests," APT User Guide, LIFFE, Jan. 1994, v4.0, pp. 35-96.
"Outline and Diagram Slides," The PIT Trading Mechanism, Slide Presentation, LIFFE, 6 pages.
"Overview of Implied Calculation Mechanism in ETS," 7 pages.
"Oxford Study Examines Economics of Price and Quote Dissemination," Securities Week, McGraw-Hill Co. Inc., Jun. 5, 1995, vol. 22, No. 23, 1 page.
"P.C. Auto Quote User Manual for Market Makers and Exchange Employees," 2nd Edition, Chicago Board Options Exchange, Chicago, IL, Dec. 1990, 50 pages.
"Patsystems (PTS)," Screenshots, Mar. 31, 1998, 6 pages.
"Performance Based Sports Derivatives: A New Instrument," Chapter 3, pp. 83-121.
"Player's Guide: Wagering Information," Lone Star Park at Grand Prairie, <http://www.lonestarpark.com/bet_info.asp>, 3 pages.
"Playing by National Rules," Global Securities, 2 pages.
"POSIT: Portfolio System for Institutional Trading," BARRA, Berkeley, CA, 4 pages.
"POSIT: Portfolio System for Institutional Trading—User's Guide," Windows Version, 93 pages.
"Power Wars," Futures, Apr. 1999, vol. 28, No. 4, p. 28.
"Presentation of Publications or the Like," JP2001-564025, Apr. 18, 2005, 27 pages (14 pages of English Translation and 13 pages of Official Copy).
"Preview Media and America Online Announce New Travel Service for America Online Subscribers," PR Newswire, Feb. 7, 1995, 2 pages.
"Private flower auction opens in Netherlands," Agra Europe, Agra Europe (London) Ltd., UK, Apr. 13, 1995, 1 page.
"Proposed Screen Formats," The International Future Exchange (Bermuda) Ltd, 4 pages.
"Publication 1: Japanese language and translation," 2001-564025, Tokyo Stock Exchange, 70 pages.
"Publication 2: Japanese language and translation," 2001-564025, Tokyo Stock Exchange, 56 pages.
"Publication 3: Japanese Language and translation," 2001-564025, Tokyo Stock Exchange, 19 pages.
"Quotron's Open Windows: Q1000 Data for PC Users," Trading Systems Technology, Waters Information Services, Inc., Oct. 10, 1988, 3 pages.
"RealTick Trading Guide," TAL Trading Tools, Townsend Analytics, Ltd., Chicago, IL, May 2000, vol. 4.0, 39 pages.

"RealTrade User Guide," TAL Trading Tools, Townsend Analytics, Ltd., Chicago, IL, Jul. 1999, vol. 2, No. 1, 64 pages.
"Record Volume on ITG Trading Desk," ITG Connect, Spring 1996, Investment Technology Group, Inc. <http://www.positcom/4con_02.html>, 3 pages.
"Regulations: The International Futures Exchange (Bermuda) Ltd.," Hamilton, Bermuda, Jan. 15, 1983, 87 pages.
"Release Note for Reuters: GL LIFFEE CONNECT Futures," GL Trade, Mar. 3, 1998, v4.50B, 9 pages.
"Report of the Federal Trade Commission on the Grain Trade," Washington Government Printing Office, Washington D.C., Sep. 15, 1920, vol. 5, 5 pages.
"Report of the Special Study of the Options Markets to the Securities and Exchange Commission," U.S. Government Printing Office, Washington D.C., Dec. 22, 1978, 3 pages.
"Report Record Earnings on Record Number of Shares Crossed for the Year 1995," ITG Press Release, The Future of Trading, Jan. 23, 1996 <http://www.itginc.com/4qpress.html>, 3 pages.
"Reports Third Quarter Results," ITG Press Release, The Future of Trading, Oct. 9, 1995, <http://www.Itginc.com/Itg_press_rel1.html>, 2 pages.
"RET Training Manual and Workstation User Guide," Registered Electronic Trader Manual, IPE, Nov. 1998.
"Reuters Buys Chunk of EFFIX; Expands Triarch/EFFIC Line," Trading Systems Technology, Waters Information Services, Inc., Jun. 15, 1992, 4 pages.
Field, Michael "Buy Equity and Stay Married," Euromoney, No. 318, Oct. 1995, pp. 1-5.
Fischetti, Mark "The Rise of E-Business: Wheeling and Dealing," IBM Research Magazine, Dec. 26, 1999, pp. 1-3.
Fontanills, George A. "The Options Course: High Profit & Low Stress Trading Methods," John Wiley & Sons, NY., 1998, 168 pages.
Fowler, David "The Future of the Internet as a Business Marketing Platform," Technical Update, Oct. 1994, 1 page.
Fox, Nicolette "The Calm Way of Buying and Selling Livestock," Sydney Morning Herald, Oct. 10, 1988, pp. 1-2.
Francioni, Reto "The German Equities Market," Global Challenges, Chapter 30, 1995, pp. 473-484.
Frank B. Dehn & Co., "European Patent Application No. 00953652.5 (1208510)," European Patent Office, Apr. 27, 2005, 29 pages.
Franklin et al., "The Design and Implementation of a Secure Auction Service," AT&T Bell Laboratories, Holmdel, New Jersey, USA, 1995, pp. 2-14.
Frazier, Deborah "Cattle Star in Stock Show's Satellite Video Auction Two-Day Bellringer Brought $30 Million as Ranchers from 35 States Tuned in," Rocky Mountain News Staff Writer, Jan. 14, 1995, 1 page.
Frino et al., "The Liquidity of Automated Exchanges: New Evidence from German Bund Futures," Journal of International Financial Markets, Institutions & Money, vol. 8, Aug. 31, 1998, pp. 225-241.
Fritschner, Sarah "Matchmaker for the Horsey Set," Nation's Business, Mar. 1986, 1 page.
Fusaro, Peter "Energy Risk Management: Hedging Strategies and Instruments for the International Energy Markets," McGraw-Hill, 1998, 149 pages.
Gaines et al., "Minicomputers in Security Dealing," University of Essex, Sep. 1976, 10 pages.
Gallo, Pete "From the TM3 Wire," The Bond Buyer, Apr. 9, 1998, pp. 8-10.
Gampetro, Tony "INTEX Gearing Up for Autumn Opening", Financial Futures Focus, Commodities, 1 page.
Gann, Simono "The LIFFE Connect Host and Network," Trading Places: A Guide to LIFFE CONNECT—LIFFE's New Electronic Trading Platform, Jul. 1999, 5 pages.
Gao "Report to Congressional Committees," United States General Accounting Office, Sep. 14, 1990, 15 pages.
Gapper, John "Stock Exchange Rival has Slow Start," Financial Times (London), Dec. 27, 1995, pp. 6-7.
Garbade, Kenneth D , "The Effect of Interdealer Brokerage the Transactional Characteristics of Dealer Markets," Journal of Business, vol. 51, No. 3, 1978, pp. 477-498.

(56) References Cited

OTHER PUBLICATIONS

Gastineau et al., "Equity Flex Options: The Financial Engineer's Most Versatile Tool," Fabozzi Associates, New Hope, PA, 1999, 18 pages.
Gastineau et al., "The Future of Equity Derivatives: What Lies Ahead?" Financial Analysts Journal, vol. 50, No. 6, Nov./Dec. 1994, 9 pages.
Gauthier, P. "LIFFE CONNECT for Futures—Project Update #1: Meeting of 6/01," GL Trade, Jan. 11, 1999, pp. 1-7.
Gauthier, P. "LIFFE CONNECT for Futures—Project Update 2: Meeting of February 2nd," GL Trade, Feb. 10, 1999, pp. 1-7.
Gebauer, Judith "Electronic Markets from an Economic Perspective," 2nd International Workshop on Electronic Markets, Ermatingen, Switzerland, Sep. 25-26, 1995, 14 pages.
Ghosh, Asim "Cross-Hedging Foreign Currency Risk: Empirical Evidence from an Error Correction Model," Review of Quantitative Finance & Accounting, Springer Netherlands, May 1996, vol. 6, No. 3, pp. 1 page.
Gianturco, Michaek "Software for Hard Choices," Forbes ASAP Supplement, Aug. 26, 1996, pp. 1-4.
Gibson et al., "The Benefits and Risks of Derivative Instruments: An Economic Perspective," Finanzmarkt Und Portfolio Management, vol. 10, No. 1, 1996, pp. 12-44.
Gilbertson, Dawn Wall Street West: Arizona Stock Exchange Battles for More Volume, The Phoenix Gazette, Mar. 30, 1993, 3 pages.
Golden, Kathleen "Under Fire: Dissemination of Market Data," Bank Systems & Technology, vol. 32 No. 5, May 1995, pp. 102-104.
Gonzalez-Hermosillo, Brenda The Microstructure of Financial Derivatives Markets: Exchange-Traded Versus Over-the-Counter, Mar. 1994, 76 pages.
Goodhart et al., "One Day in Jun. 1993: A Study of the Working of the Reuters Feb. 2000 Electronic Foreign Exchange Trading System," The Microstructure of Foreign Exchange Markets, 1996, 39 pages.
Goodman, Ann "Back to the Future," Wall Street & Technology, vol. 9, No. 6, Feb. 1992, pp. 48-52.
Goodman, Ann "New Trading Products Spawn New System; The Chicago Board of Trade is Building a New Electronic Trading System," Wall Street Computer Review, vol. 9, No. 4, Jan. 1992, 5 pages.
Gordon, Pat "New Brand of Video Cattlemen Move 'em Out by Making Movies for Livestock Auctions," The Dallas Morning News, Nov. 2, 1987, pp. 1-3.
Gray, Tony "City Comment," Lloyds List, Intex Press Information, Sep. 20, 1982, 3 pages.
Greenberg, Peter S. "The Savvy Traveler: Lower Air Fares for Consumers Not in the Cards," Los Angeles Times, Jul. 8, 1990, pp. 2-5.
Grody et al., "Global Electronic Markets: A Preliminary Report of Findings," Center for Digital Economy Research, May 31, 1994, 39 pages.
Grody, et al., "Past, Present and Future: The Evolution and Development of Electronic Financial Markets," Center for Digital Economy Research, Working Paper Series, IS-95-21, Nov. 1993, 13 pages.
Grossman et al., "Liquidity and Market Structure," The Journal of Finance, vol. 43, No. 3, Jul. 1988, 18 pages.
Grover, Christopher Forest "What Price, Art?" CD-Rom World, Sep. 1994, 2 pages.
Grunbichler et. al., "The Volatility of the German and Swiss Equity Markets," Finanzmarkt Und Portfolio Management, vol. 7, No. 2, 1993, pp. 205-215.
Gutner, Toddi "The E-Bond Revolution: How the Internet is Reshaping the World's Largest Financial Market," Businessweek Online, Nov. 15, 1999, pp. 1-5.
Hagerud, Gustaf "A New Non-Linear GARCH Model," PhD Dissertation, Stockholm School of Economics, 1997, 154 pages.
Hakansson et al."On the Feasibility of Automated Market Making by a Programmed Specialist," Journal of Finance, vol. XL, No. 1, Mar. 1985, pp. 1-21.

Hamao et al., "Securities Trading in the Absence of Dealers: Trades, and Quotes on the Tokyo Stock Exchange," Review of Financial Studies, Fall 1995, vol. 8, No. 3, pp. 849-878.
Hamon et al., "Market Structure and the Supply of Liquidity," Technological and Competitive Challenges, Chapter 5, 1995, pp. 76-89.
Handa et al., "How Best to Supply Liquidity to a Securities Market," Journal of Portfolio Management, Winter 1996 pp. 44-51.
Handa et al., "The Ecology of an Order-Driven Market," Journal of Portfolio Management, Winter 1998, pp. 47-55.
Hansell, Saul "The Computer that Ate Chicago," Institutional Investor, Feb. 1989, 5 pages.
Hansell, Saul "Will Bill Donaldson Go the Way of Gorbachev," Institutional Investor, Feb. 1992, 9 pages.
BondWeek, vol. X, No. 36, Sep. 10, 1990, 3 pages.
BondWeek, vol. XII, No. 38, Sep. 21, 1992, 3 pages.
BondWeek, vol. XI, No. 38, Sep. 23, 1991, 2 pages.
Booth et al., "Price and Volatility Spillover in Scandinavian Stock Markets," Journal of Banking & Finance, vol. 21, 1997, pp. 811-823.
Breedon et al., "Electronic Versus Open Outcry Markets: The Case of the Bund Futures Contract," Bank of England, London, England, 1997, pp. 1-34.
Brown et al., "The Design of Limit Orders," Indiana University, Dec. 1993, pp. 1-23.
Brown, David "Bids Go Sky High at Satellite Cattle Sale," The Daily Telegraph, Oct. 31, 1992, 1 page.
Brown, Sidney "Electronic Commodities Market to Operate Offshore," Dollar, The International Journal of American Investments, May 1982, 9 pages.
Bruce et al., "Investigating the Roots of the Favourite-Longshot Bias: An Analysis of Decision Making by Supply- and Demand-Side Agents in Parallel Betting Markets," Journal of Behavioural Decision-Making, vol. 13, 2000, pp. 413-430.
Bruce et al., "Market Efficiency Analysis Requires a Sensitivity to Market Characteristics: Some Observations on a Recent Study of Betting Market Efficiency," Applied Economics Letters, vol. 7, 2000, pp. 199-202.
Bryant, Adam "Am I Bid Six? Click to Bid Six!; Airlines are the Latest to Move to on-Line Auctions," The New York Times, May 13, 1996, pp. 2-4.
Bryant, Adam "Technology—Looking for Low-Price Airline Tickets? Take Quick Trip to Internet Auction" The Commercial Appeal (Memphis), May 14, 1996, pp. 2-3.
Bucken, Mike "Stock Traders Ponder 'Make' or 'Buy' Choice," Software Magazine, vol. 9, No. 15, Dec. 1989, pp. 75-77.
Buckle et al., "The UK Financial System: Theory and Practice," Second Edition, Manchester University Press, 1995, 189 pages.
Bunker, Ted "How Auction Technology Sped and Enhanced Sale of Radio Licenses," Investor's Business Daily, Feb. 24, 1995, 3 pages.
Burden "Pig Men Plug Into Computers," Australian Financial Review, Sep. 19, 1984, 1 page.
Burrus, Victoria "The Change Page—The Virtual Stockyard Herd Instincts / Today's Ranchers are as Likely to be Punching Computers as Steers. The Electronic Auction has become an Established Part of the Cattle Business—and the Salvation of One Auction Company," The Globe and Mail, Sep. 27, 1994, pp. 1-4.
Busche et al., "Decision Costs and Betting Market Efficiency," Rationality and Society, vol. 12, No. 4, 2000, pp. 477-492.
Byrne, John A. "Is the Reform Worse than the Problem? A Stock Market Chief Takes a Second Look at the SEC's History of Breaking up Dealer Monopolies" Traders Magazine, Dec. 1, 1999, 4 pages.
Carey, Christopher "Firm Offers Auction for Airline Tickets," St. Louis Post-Dispatch, Aug. 7, 1991, pp. 1-2.
Carlsen, Clifford "From Airline Tickets to Human Organs, the Electronic Markets are Booming," San Francisco Business Times, Aug. 14, 1989, vol. 3, No. 50, Section 1, pp. 1-3.
Carr et al., "Towards a Theory of Volatility Trading," Dec. 16, 1997, 22 pages.
Carrington, Tim "Computer Linkups Letting Traders Start Up Securities Firms at Home," The Wall Street Journal, Dec. 9, 1981, 1 page.

(56) References Cited

OTHER PUBLICATIONS

Casey, Michael "With 5th Market, Convertibles Set for Online Trading," Dow Jones International News, Dec. 27, 1999, pp. 1-2.
Cass, Maxine "West Coast Agents Remain Skeptical About New Air Ticket Sales Plan; Marketel: Airline Ticket Sales System Sparks Concern," Travel Agent Magazine, Sep. 2, 1991, 3 pages.
Cassady Jr., Ralph "Auctions and Auctioneering," University of California Press, 1967, 16 pages.
Castro, Laura L. "Fish Sales Flounder in Brooklyn," Newsday, Dec. 19, 1987, pp. 1-2.
Cavaletti, Carla "Electronic Order Routing: Quick, Efficient, and Controversial," Futures, 1997, pp. 68-70.
Cavalier, Rodney "Micro-Chip V Saleyard," Australian Financial Review, Aug. 15, 1988, pp. 1-4.
CBOT, "CBOT Technology Chronology," PowerPoint Presentation, Chicago Board of Trade, 5 pages.
Chamberlain, Art "Cyber-Shopping Made Safe Encrypted System Created to Block Hackers from Stealing Credit Card Numbers on the Internet," The Toronto Star, May 25, 1996, pp. 2-3.
Chapman, Peter "Order out of Chaos on Buy-Side Desks: Proliferating Order Management Systems," Traders Magazine, Sep. 1999, pp. 1-4.
Charlier, Marj "Video Auctions Could Spell End for Stockyards," The Wall Street Journal, Nov. 2, 1988, pp. 1-2.
Charton, Scott "Video Livestock Auctions don't Dirty Buyers' Boots," Houston Chronicle, Feb. 18, 1991, pp. 1-2.
Cheronet, Nicolas "Trading Pad: Business Requirements," GL Trade, Jun. 8, 1999, pp. 10-19.
Clarke, Roger "Case-Study: OM Financial Derivative Exchanges," Xamax Consultancy Pty Ltd., Jun. 10, 1994, 10 pages.
Clemons et al., "Restructuring Institutional Block Trading: An Overview of the Optimark System," New York University, Salomon Center, Working Paper Series, S-97-21, Oct. 1997, 11 pages.
Clemons et al., "Restructuring Institutional Block Trading: An Overview of the OptiMark System," Journal of Management Information Systems, JMIS, vol. 15, No. 2, Fall 1998, pp. 41-60.
Clemons et al., "Restructuring Institutional Block Trading: An Overview of the OptiMark System," 1998, 10 pages.
Coffee, John C Jr. "Brave New World?: The impact(s) of the Internet on Modern Securities Regulation," Business Lawyer, vol. 52, No. 4, Aug. 1997, pp. 63-97.
Coggan, Philip "Weekend Money: Making Sense of the Market Maze—Where's Best to Invest? Philip Coggan Explores a World Where Even Professionals Can Get Confused," Financial Times (London), Nov. 4, 1995, pp. 9-11.
Cohen et al., "An Electronic Call Market: It's Design and Desirability," The Challenge of Information Technology for the Securities Markets, 1989, 23 pages.
Cole, Jeff "Fare Bidding Plan Could be the Ticket," St. Paul Pioneer Press Dispatch, Business, Mar. 11, 1990, 2 pages.
Coleman, Zach "Electronic Trading System Matches Buyers, Sellers," 1 page.
Commins, Kevin "Gold Future: Facts & Figures, Trading Strategies & Tactics," Probus Publishing Company, Chicago, Illinois, 1990, 143 pages.
Connor, John "GAO: Automated Tsy Auctions Cut Time, But Problems Remain," Dow Jones News/Wall Street Journal Combined Stories, Sep. 6, 1994, pp. 1-2.
Connor, John "House Panel Wants Treasury to Protect Computer Auction System," Dow Jones News Service—Ticker, Jul. 8, 1993, pp. 1.
Cooke, Stephanie "The Threat from Cyberspace," Euromoney, Dec. 1994, pp. 105-110.
Coppejans et. al., "Screen Information, Trader Activity, and Bid-Ask Spreads in a Limit Order Market," Aug. 1999, 48 pages.
Corcella, Karen "Symphony Plays a Solo," Wall Street & Technology, Mar. 1995, vol. 12, No. 11, 3 pages.
"Cathay Pacific Airways Auctions a Boeing 747-400 Worth of Seats in Third Cybertraveler Auction," Business Wire, Apr. 29, 1996, 2 pages.
"Cathay Pacific Online Ticket Bidding," WIND, COSMO21/Cosmotek Interactive Technology, Inc., May 8, 1996, 1 page.
"CATS Project Notice-79-2: New Features Announcement," The Toronto Stock Exchange, Mar. 15, 1979, 23 pages.
"CATS Project Notice-79-3: CATS Service and Information Centre," The Toronto Stock Exchange, Mar. 2, 1979, 3 pages.
"CATS Traders Manual—CATS Project Notice-79-3," The Toronto Stock Exchange, Mar. 15, 1979, 142 pages.
"CATS Traders' Manual," The Toronto Stock Exchange, Feb. 22, 1979, 106 pages.
"Cattlemen Tune in to Video Auctions," The Omaha World-Herald, Omaha World-Herald Company, Jun. 17, 1990, 2 pages.
"CBOT and Eurex Announce Trading Alliance," Wall Street & Technology, Chicago Board of Trade, Chicago, IL., May 1998, vol. 16, No. 5, 1 page.
"Certificate of Incorporation," INTEX Holdings (Bermuda) Ltd., Feb. 16, 1981, 1 page.
"CFTC Report on NYMEX's Proposal to Implement the NYMEX ACCESS Trading System," Dec. 7, 1992, 102 pages.
"Changing Relationships," Chartered Banker, Oct. 1997, vol. 3, No. 10, 6 pages.
"CIBC/Wood Gundy Proprietary Traders Lead the Way for 275-Position Room," Trading Systems Technology, Waters Information Services, Inc., Jul. 13, 1992, 3 pages.
"Clearing Members," Appendix D, Chicago Board of Trade, Chicago, IL, 2 pages.
"Click Trading," OM London, Ltd., London, 8 pages.
"CME Adds Second Market Maker to Enhance Liquidity in Deutsche Spot Contract," Securities Week, McGraw-Hill Inc., Dec. 20, 1993, vol. 20, No. 51, 1 page.
"CME GLOBEX Member Firm Operations Manual," GLOBEX, Chicago Mercantile Exchange, Chicago, IL, 1992, 105 pages.
"CME to Continue Waiving Clearing Fees for GSCI Contract Market Makers," Securities Week, McGraw-Hill Inc., Jul. 12, 1993, vol. 20, No. 28, 1 page.
"CME, CBOE Announce Plans to List Futures and Options on Jointly Developed Mexican Stock Index," PR Newswire, PR Newswire Association, Inc., Aug. 24, 1995, 3 pages.
"Commodity Briefs," Journal of Commerce, The Journal of Commerce, Inc., Aug. 12, 1992, 2 pages.
"Commodity Markets," The Education and Publication Services Department, Chicago Board of Trade, Chicago, IL, 1983, 18 pages.
"Commodity Trading Manual," Exhibit 10, Chicago Board of Trade, Chicago, IL., 1989, 24 pages.
"Computer Assisted Trading: A Feasibility Study," The Toronto Stock Exchange, Business Information Systems, vol. 2, Jun. 1970, 414 pages.
"Computer Takes on Role of Auctioneer at Livestock Market," Business Today, The Toronto Star, Feb. 15, 1987, 2 pages.
"Computerized Trading," Commodity Futures Trading Commission, Washington D.C., Nov. 1994, 126 pages.
"Dallas Gold & Silver Exchange, Inc. Announces Substantial Expansion of Internet Activities," PR Newswire, PR Newswire Association, Inc., Mar. 27, 1996, 1 page.
"Data Exchange, Salomon Launch Equities Order-Routing System," Trading Systems Technology, Waters Information Services, Inc., Jul. 29, 1991, 2 pages.
"Davidge Debuts DOT/PC Order Routing for NYSE Members," Trading Systems Technology, Waters Information Services, Inc., Sep. 28, 1987, 1 page.
"Day Trading Strategies," TradeTrek.com, <http://www.tradetrek.com/education/Day_Trading/breakouts.asp>, pp. 1-3.
"Debis Financial Services: Debis Prepares to Put UK Auctions On-line," M2 Presswire, M2 Communications, Mar. 8, 1996, 2 pages.
"Delphi Moves HQ to New York, Adds 750 Jobs," Newsbytes, Post-Newsweek Business Information Inc., May 4, 1995, 2 pages.
"Derivatives Engineering: A Guide to Structuring, Pricing, and Marketing Derivatives," The Globecon Group, Ltd., IRWIN Professional Publishing, Burr Ridge, IL., 1995, 176 pages.
"Directory of Software Solutions: For LIFFE Connect," LIFFE's New Electronic Trading Platform, LIFFE CONNECT, Issue 1, Oct. 1998, 19 pages.

(56) References Cited

OTHER PUBLICATIONS

"DTB Launches Eurex Software," E-Xeurex, <http://www.eurexchange.com/about/press/press_30_en.html>, May 11, 1998, 2 pages.
"DTB Member Interface Specification," Deutsche Borse Group, DTB Release 4, Deutsche Borse AG, Frankfurt/Main, Jun. 26, 1997, 64 pages.
"DTB Member Manual Trading: Purpose of Use of the Manual," Deutsche Borse Group, OTB Release 4.2, Deutsche Borse AG, Frankfurt/Main, Apr. 28, 1997, 313 pages.
"Electronic Systems Increase Market Share," AsiaMoney, UMI, Inc., Dec. 1995/Jan. 1996, vol. 6, No. 10, 4 pages.
"Electronic Trade Matching Puts Small Investors on Par with Institutions," ITG Press Release, <http://www.itginc.com/presindi.html>, Dec. 9, 1996, pp. 1-2.
"ETS Workstation User Manual," Registered Gas Trader, IPE, Sep. 1996, 116 pages.
"European Stockmarkets," The Economist, Jun. 19-25, 1993, pp. 21-23.
"Exchanges: Building a Better Stock Market Using Call Auctions," Securities Industry News, Securities Data Publishing, Mar. 20, 2000, 9 pages.
"Expression (Mathematics)," Wikipedia, <http://en.wikipedia.org/wiki/Mathematical_expresssion>, Jun. 14, 2006, 2 pages.
"EY 0112 (Market Depth Window Dec. 2001)," Screenshot, 1 page.
"FCC Opens High-Tech Wireless Services Auction 10 Nationwide Licenses Offered; Bids Could Well Hit $50 million," The Star-Ledger, Newark, Morning Ledger Co., Jul. 26, 1994, 2 pages.
"Financial Technology Corp. Unveils Basket Trading System," Trading Systems Technology, Waters Information Services, Inc., Jun. 17, 1991, 2 pages.
"Firm Goes Online with Auction," Canadian Press, The Toronto Star, Apr. 21, 1996, 2 pages.
"First Chicago Replaces Chemical Bank as Market Maker in CME Deutsche 'Spot' Contract," Securities Week, McGraw-Hill Inc., Apr. 4, 1994, vol. 21, No. 14, 1 page.
"First Options Seeks to Acquire Kessler Asher's CBOE Clearing Operations," Securities Week, McGraw-Hill Inc., Jun. 27, 1994, vol. 21, No. 26, 2 pages.
"First Wine Auctioned Live in Cyberspace; Simultaneous Live and Cyber Wine Auction Benefits Charity," Business Wire, Inc., May 22, 1996, 2 pages.
"First-ever Internet Auction Produces Results for the Computer Museum," Business Wire, Inc., Apr. 28, 1994, 2 pages.
Bradshaw et al., "Oracle9i Application Developer's Guide—Advanced Queuing Release 2 (9.2)", Mar. 2002, URL: http://www.oracle.com/pls/db92/db92.to_pdf?pathname=appdev.920%2Fa96587.pdf&remark=docindex>, 114 pages.
"INTEX: This New Exchange Is the Fastest and Most Accurate Futures Trading System Anywhere—and It's World-wide," The International Futures Exchange(Bermuda) Ltd, New York, NY, Jun. 17, 1982, 1 page.
"Introducing GLOBEX2 From the CME," Chicago Mercantile Exchange, 1998, 1 page.
"Introducing New York Mercantile Exchange Access," Brochure, New York Mercantile Exchange, 14 pages.
"Introducing the OptiMark System—OptiMark, IBM, Dow Jones, State Street Bank, Pacific Stock Exchange and Chicago Board Options Exchange Team Up to Introduce Revolutionary Trading System" OptiMark Technologies, Inc., Durango, CO, Sep. 24, 18 pages.
"Introduction to INTEX," INTEX, The International Futures Exchange (Bermuda) Ltd., Bermuda, 2 pages.
"IOSCO Report: Screen-Based Trading Systems for Derivative Products," New Developments, pp. 37845-37859.
"ITG Links Up With AZX, Bridge," Wall Street Letter, Institutional Investor, Inc., Sep. 27, 1993, vol. XXV, No. 39, 1 page.
"ITG POSIT", Brochure, ITG Inc., New York, NY, 4 pages.
"ITG POSIT: How POSIT Works," ITG POSIT, <http://www.itginc.com/products/pos_works.html>, Aug. 20, 1998, 1 page.
"ITG POSIT: ITG POSIT Keeps Growing," POSIT Volume History,<http://www.itginc.com/itg_posit_vol_hist.html>, Aug. 20, 1998, 3 pages.
"ITG POSIT," ITG POSIT, ITG Inc., Product Literature, New York, NY, 20 Pages.
"ITG POSIT: The Advantages of POSIT," ITG POSIT, <http://www.itginc.com/products/pos_advan.html>, Aug. 20, 1998, 2 pages.
"ITG POSIT: The World's Largest Intra-day Trade Matching System," ITG POSIT, <http:/itginc.com/products/posit.html>, Aug. 19, 1998, 2 pages.
"ITG Products: The Future of Trading," <http://www.itginc.com/products/products.html>, Aug. 19, 1998, 1 page.
"ITG QuantEX and Installation Guide", ITG Inc., New York, 44 pages.
"ITG QuantEX," Brochure, ITG, Inc., New York, NY, 43 Pages.
"J.P. Morgan Selects UNIX for Program-Trading Group," Trading Systems Technology, Waters Information Services, Inc., Apr. 20, 1992, 3 pages.
"J.P. Morgan, PricewaterhouseCoopers Propose FpML, a New E-commerce Standard," Press Releases, <http://xml.coverpages.org/fpml-press9906.html>, Jun. 9, 1999.
"Japan firm, Aucnet, to Supply GM Computer System to Auction Cars," Japan Economic Journal, The Nihon Keizai Shimbun, Jul. 19, 1986, 1 page.
"Java Island Book Viewer," The Island ECN, Inc., <http://www.isld.com/itchclient/index.html>, 1999, 40 pages.
"Joint Report on the Government Securities Market," U.S. Government Printing Office, Washington D.C., Jan. 22, 1992, 196 pages.
"KIIS & Unite III Takes It to the Next Level with the World Wide Web Auction and a Special Appearance by Madonna," Business Wire, Jun. 27, 1995, 2 pages.
"Knight-Ridder Newspapers," PR Newswire, Oct. 1, 1985, 2 pages.
"KPMG Seminar Brings Clarity to FASB 133," PR Newswire, <http://www.highbeam.com/doc/1G1-53047941.html>, Oct. 1, 1998, 2 pages.
"Late but Hopeful, Intex Looks for Summer Start Up," INTEX, Futures World, Jun. 14, 1984, 3 pages.
"Learn to Play the Races!," Daily Racing Form, 15 pages.
"Learning Curves: The Guide to Understanding Derivatives," Derivatives Week, Institutional Investor, Inc., 1994, 95 pages.
"Let's Do Wunsch; Electronic European Exchange in the Works," Wall Street Letter, Institutional Investor, Inc., Jul. 13, 1992, vol. XXIV, No. 28, 2 pages.
"LIFE CONNECT for Individual Equity Options: Stock Contingent Trades,", LIFFE, London, Nov. 27, 1998, General Notice No. 1320, 2 pages.
"LIFFE CONNECT for Equity Options: User Guide," GL Trade, London, Aug. 1998, v4.2, 23 pages.
"LIFFE CONNECT for Equity Options: User Guide," GL Trade, London, Nov. 1998, v4.30, 35 pages.
"LIFFE CONNECT for Financial Futures—Introduction of Implied Trading Functionality," LIFFE, Aug. 4, 1999, General Notice No. 1460, 3 pages.
"LIFFE CONNECT for Futures—Functional Enhancements," GL Trade, Mar. 3, 1999, 19 pages.
"LIFFE CONNECT for Futures," Brochure, GL Trade, Paris, 6 pages.
"LIFFE CONNECT for Futures: Project Summary," GL Trade, Apr. 19, 1999, 13 pages.
"LIFFE CONNECT for Individual Equity Options," LIFFE, London, Nov. 20, 1998, General Notice No. 1315, 8 pages.
LIFFE Connect Futures Release Note 050399.doc: Release Note for Reuters GL LIFFE CONNECT Futures, Document Information, GL Trade, Mar. 3, 1999, 6 pages.
"LIT Uses Beats to Route Orders to NYSE's Superdot," Trading Systems Technology, Waters Information Services, Inc., Sep. 23, 1991, 3 pages.
"Illiquid Securities Auction Organizers See Wide Participation in Today's Kickoff," BondWeek, Institutional Investor, Inc., Jul. 16, 1990, vol. X, No. 28, 2 pages.
"Instinet List Trading," Instinet, Instinet Corporation, Feb. 1995, 267 pages.

(56) References Cited

OTHER PUBLICATIONS

"Instinet On-Line System User Documentation," Instinet Corporation, 1987, 181 pages.
"Instinet Trading: A Guide," Instinet, v4.5C, Traditional Terminal, Instinet Corporation, 1994, 45 pages.
"Instinet Trading: A Guide," Instinet, v4.5C Workstation, Instinet Corporation, 1994, 53 pages.
"Instinet: Quick Reference Guide," Instinet, v.2.3.6 workstation and v4.4 Dwindows, Instinet Corporation, 1993, 85 pages.
"Major Wall Street Firms Form New Electronic Trading Network," PR Newswire, PR Newswire Association, Inc., Jun. 15, 1993, 2 pages.
"MEFF," Screenshot, 1985, 1 page.
"MEMPI Programmable Interfaces Pricing Model Input, Backoffice and Trading Programmer's Guide and Reference," Deutsche Borse Group, DTB Release 4, Frankfurt/Main, Apr. 28, 1997, 231 pages.
"MERC Gets CFTC Approval to Begin Market Maker Program to Support Its New and Low-Volume Contracts," Securities Week, McGraw-Hill Inc., May 1, 1995, vol. 22, No. 18, 2 pages.
"MERC to Support New Equity Products With Primary Market-Maker Program," Securities Week, McGraw-Hill inc., Sep. 19, 1994, vol. 21, No. 38, 2 pages.
"Mesa," Next World, Athena Design, Inc., Boston MA, Apr. 1991, 32 pages.
"ITG Platform," Brochure, printed Aug. 28, 1998.
"Wit Capital Acquires Software Plus Core Development Team", Business Wire, Sep. 4, 1996.
77 Ref. Reg. 48734 (Aug. 14, 2012.
Communication in EP15202162.2, dated Mar. 14, 2016, with European Search Report dated Mar. 4, 2016.
Platform 2.0 Software Installation Guide dated Jan. 22, 1998.
Printout from internet of information about "Net Exchange", dated of publication unknown but prior to Feb. 16, 1999.
Waldman, Adam R. "OTC Derivatives & Systemic Risk: Innovative Finance or the Dance into the Abyss?" American University Law Review, vol. 43, 1994, pp. 1023-1090.
Wallace, Anise C. "Market Place: A Wary Response to 'Junk' Auction," New York Times, Section D, Aug. 13, 1990, pp. 2-3.
Wallman, Steven M.H. "Technology takes to securities trading," IEEE Spectrum, Feb. 1997, pp. 60-65.
Walmsley, Julian "The New Financial Instruments: An Investor's Guide," John Wiley & Sons, NY., 1988, pp. 3-454.
Walsh, Vincent "Transaction Settlement: The Final Step," 1989, pp. 91-108.
Wang, Jianxin "Asymmetric Information and the Bid-Ask Spread," Journal of International Financial Markets, Institutions and Money, vol. 9, 1999, pp. 115-128.
Warbelow et. al., "AUCNET: TV Auction Network System," Harvard Business School lecture, Apr. 12, 1996, pp. 1-15.
Warbelow, Arthur W. "Electronic Market Access Forums in Non-Homogeneous Markets," PhD Dissertation, Harvard University, 1992, 29 pages.
Ward, Getahn "Entrepreneurial Traders Develop New Marketing Tool," The Tennessean, Sep. 1, 1999, 2 pages.
Ware et al., "The Search for Digital Excellence", 1998, pp. 235-243.
Warneke, Kent "Omaha to See First Video Cattle Sale Today," Omaha World-Herald, Feb. 7, 1985, pp. 1-2.
Waters, Richard "The Price of a Share in the Cake," Financial Times (London), Jan. 31, 1994, 3 pages.
Watson, Catherine "Dutch Flower Auctions are Fast-Paced, Mystery Blend of Nature, Technology," Star-Tribune/Twin Cities Mpls.-St. Paul, Feb. 12, 1995, 2 pages.
Wayner, Peter "Time and Money," Byte, Apr. 1990, pp. 252-258.
Webb, Jean A. "Globex Trading System," Letter to Carl A. Royal, Esq. of Chicago Mercantile Exchange, CFTC, Washington D.C., Feb. 8, 1989, 58 pages.
Webb, Jean A. "NYMEX ACCESS Trading System," Letter to Ronald S. Oppenheimer of New York Mercantile Exchange, CFTC, Washington D.C., Dec. 17, 1992.

Weber, Bruce W. "Information Technology in the Major International Financial Markets," NYU Working Paper, Apr. 7, 1993, pp. 1-43.
Weber, Bruce W. "Screen-Based Trading in Futures Markets," 32nd Hawaii International Conference on System Sciences, 1999, 20 pages.
Welch et al., "A Profitable Call Spreading Strategy on the CBOE," The Journal of Derivatives, Spring 1995, No. 9950, pp. 23-44.
Wernle, Bradford, "AUCNET Plans New Channel for Used Cars," Automotive News, Feb. 19, 1996, pp. 54.
Wheeler, Jonathan C. "Declaration of Jonathan C. Wheeler," Declaration with Exhibits, May 5, 2011, 357 pages.
Wheeler, Stuart, "Quote of the Day," 1 page.
Williams, Arlington W. "Computerized Double-Auction Markets: Some Initial Experimental Results," Journal of Business, vol. 53, No. 3, 1980, pp. 235-258.
Williams, Leighton Vaughan "Information Efficiency in Betting Markets: A Survey," Bulletin of Economic Research, vol. 51, No. 1, 1999, pp. 1-30.
Williams, Monci Jo "Why the Big Players want a Piece of Instinet", Fortune, Aug. 19, 1985, p. 129.
Willoughby, Jack "Bond trader's field of dreams," Investment Dealers' Digest, May 22, 1995, 3 pages.
Willoughby, Jack "Bond trader's field of dreams," Investment Dealers' Digest, May 1, 1995, 2 pages.
Wilson et al., "Corporate Bonds: Structures & Analysis," Frank J Fabozzi Associates, New Hope, PA., 1996, 10 pages.
Wilson, Robert "Design of Efficient Trading Procedures," The Double Auction Market, SFI Studies in the Sciences of Complexity, Addison-Wesley, 1993, 15 pages.
Wipperfurth, Heike "BONDNET Hires Corporate Bond Broker, Ednie," Securities Week, Dec. 18, 1995, vol. 22, No. 51, p. 5.
Wisz, Gerald "The demise of the Nasdaq market-maker," Global Investor, Feb. 1998, No. 109, pp. 42-43.
Wohl et al., "An Index-Contingent Trading Mechanism: Economic Implications," Dec. 1994, 26 pages.
Wohl et al., "Implications of an Index-Contingent Trading Mechanism," Journal of Business, vol. 70, No. 4, 1997, pp. 471-488.
Wohl, Avi "The Feasibility of an Index-Contingent Trading Mechanism," Management Science, Jan. 1997, vol. 43, No. 1, pp. 112-121.
Woodie, Alex "Bristol Release Enterprise Transaction Monitor." Midrange Stuff, 2002, pp. 1-2.
Wren, Worth "Cattle Auctions Step into the Electronic Age," Fort Worth Star-Telegram, Jan. 28, 1991, pp. 4.
Wright, William "Information Animation Applications in the Capital Markets," IEEE, 1995, pp. 19-25.
Wunsch, R. Steven "Time to Change Open Outcry Method," Futures, Sep. 1987, pp. 12-16.
Wunsch, Steven "The Single-Price Auction," The Complete Guide to Securities Transactions, Wayne H Wagner, ed., John Wiley & Sons, NY, 1989, pp. 279-290.
Wurman et al., "A Control Architecture for Flexible Internet Auction Servers," Umich Artificial Intelligence Laboratory, Feb. 6, 1999, pp. 1-12.
Wurman et al., "Flexible Double Auctions for Electronic Commerce: Theory and Implementation," Decision Support Systems, vol. 24, 1998, pp. 17-27.
Zampetakis, Helene "Computers Put Fish Auctions on Much More Efficient Scale," Australian Financial Review, Oct. 30, 1989, pp. 47.
Supplementary European Search Report Received for European Patent Application Serial No. EP03764538.1 dated Nov. 14, 2005, 4 pages.
Kolb, Robert, W., "Understanding Options", John Wiley & Sons Inc., NY, 1995, 202 pages.
Kolb, Robert, W., "Futures, Options, and Swaps", 2nd Edition, Blackwell Publishers Ltd., Malden, MA, 1997, 712 pages.
Kolb, Robert, W., "Understanding Futures Markets", 3rd Edition, NY Institute of Finance, NY, 1991, 679 pages.
Kolb, Robert, W., "Understanding Futures Markets", 5th Edition, NY Institute of Finance, NY, 1997, 277 pages.
Korper et al., "Auction Technology", The E-Commerce Book: Building the E-Empire, Academic Press, San Francisco, 2000, 15 pages.

(56) References Cited

OTHER PUBLICATIONS

Kotun et al., "Phase2: System Requirements", GLOBEX, Chicago Mercantile Exchange, Oct. 31, 1988, 151 pages.
Kraus, Thomas, "Die Rolle Von OTC-Optionsmarkten Bei Dynamischen Hedgingstrategien", Finanzmarkt Und Portfolio Management vol. 11, No. 4, 1997, pp. 460-469.
Kritayanavaj, Ballobh, "The Mortgage-Backed Securities Market in Thailand", Thailand, 64 pages.
Kuklenski, Valerie, "Rock art for Sale on Computer Web", United Press International, Apr. 24, 1995, 1 page.
Kull et al., "The House of Games", Computer Decisions, vol. 20, No. 8, Aug. 1988, 1 page.
Kumar et al., "Internet Auctions", IBM Research Division, T. J. Watson Research Center, Yorktown Heights, NY., 12 pages.
Kunkes, Eric L., "NYMEX ACCESS Rules", Memorandum to Neal Wolkoff, et al., New York Mercantile Exchange, May 5, 1993, 2 page.
Kuttner, Robert, "Computers May Turn the World into One Big Commodities Pit", Business Week, vol. 31, No. 23, Sep. 11, 1989, pp. 1-3.
Lacy, Allen, "Bidding for Blossoms", The Wall Street Journal, Feb. 22, 1984, pp. 1-2.
Lagrange, Audrey, "GL Trade Headquarters Email Correspondence", May 26, 2005, 1 page.
Landis, Kenneth M., "Fully Integrated Quotation and Analytic System Adds up to a Sophisticated Workstation that Stands out in the Crowd", Wall Street Computer Review, vol. 5, No. 7, Apr. 1988, 7 pages.
Larsen et al., "Hedging Foreign Currency Transaction Exposure: The Importance of Real Rates of Interest", Journal of Financial & Strategic Decisions, vol. 9, No. 1, Spring 1996, 1 page.
Lauriston, Robert, "Comforts of Home", NeXTWORLD, 1 page.
Lauriston, Robert, "Dueling Spreadsheets", Questor Takes Aim at Mesa While Solution Takes Target Practice, 1 page.
Lawton, John C., "Letter to Arthur W. Hahn, Esq. of Katten Muchin & Zavis", Sections 5 and 5a—The International Petroleum Exchange of London Limited; Request for No-Action Relief from Contract Market Designation Requirement, CFTC Letter No. 99-69, Nov. 12, 1999, 24 pages.
Layda, Torsten, "An Order Matcher for an Electronic Stock Exchange", DesignFest'97: Electronic Stock Exchange, Sep. 23/24, 2001, 12 pages.
Ledyard et al., "Experiments Testings Multiobject Allocation Mechanisms", Journal of Economics & Management Strategy, vol. 6, No. 3, Fall 1997, pp. 639-675.
Lee, Charles M. C., "Market Integration and Price Execution for NYSE-Listed Securities", The Journal of Finance, Jul. 1993, vol. 48, No. 3, pp. 1009-1038.
Lee, Ho Geun, "AUCNET: Electronic Intermediary for Used-Car Transactions", Focus Theme, Electronic Markets, vol. 7, No. 4, 1997, 5 pages.
Lee, Ho Geun, "Do Electronic Marketplaces Lower the Price of Goods?", Communications of the ACM, vol. 41, No. 1, Jan. 1998, pp. 73-80.
Lee, Ho Geun, "Intelligent Order Matching Systems for Commodity Markets", Intelligent Systems in Accounting, Finance and Management, vol. 4, 1995, pp. 1-12.
Lee, Peter, "The fight to Gain Control of World Equities", LexisNexis, Euromoney Publications, vol. 231, No. 4, Jul. 1993, pp. 111-120.
Lee, Ruben, "What is an Exchange?, The Automation, Management, and Regulation of Financial Markets", Oxford University Press, England, 1998, 29 pages.
Lefoll et. al., "Arbitrage Conditions for Option Pricing on the SOFFEX", Finanzmarkt Und Portfolio Management, No. 2, 1990, pp. 129-143.
Leinweber et al., "A Little Artificial Intelligence Goes a Long Way on Wall Street", The Journal of Portfolio Management, Winter, 1996, pp. 95-106.
Leinweber, David J., "Using Information from Trading in Trading and Portfolio Management", Institutional Investor, Summer, vol. 4, No. 2, 1995, pp. 2-13.
Levecq et al., "Electronic Trading Systems: Strategic Implications of Market Design Choices", New York University, Working Paper Series, IS-95-19, Mar. 3, 1995, 30 pages.
Lewis, Peter H., "Company News: Auction of Collectibles on the Internet", The New York Times Company, May 23, 1995, Section D, 1 page.
Littlefair, T., "Homelink: A Unique Service", Computer Bulletin, Jun. 1986, pp. 12-13.
Louis, J. C., "Advances in ECNs", Wall Street & Technology, Second Quarter 1999, pp. 9-12.
Lucking-Reilly, David, "Auctions on the Internet: What's Being Auctioned, and How?", Vanderbilt University, Aug. 14, 1999, 55 pages.
Lucking-Reilly, David, "Vickrey Auctions Predate Vickrey", Journal of Economic Perspectives, Jun. 1999, 11 pages.
Lundbergh et. al., "Modelling Economic High-Frequency Time Series", Stockholm School of Economics, Working Paper, Dec. 22, 1998, 48 pages.
Lux, Hal, "Institutional Stock Exchange Puts Order Book on the Web", Investment Dealers' Digest, Firms & Exchange, Nov. 20, 1995, pp. pp. 2-3.
Lux, Hal, "New Arizona Exchange Opens with Decent, Steady Volume; Trading System Increase Pressure on Exchanges", Investment Dealers' Digest Inc., Firms & Exchange, Apr. 20, 1992, pp. 2-3.
Lux, Hal, "Stock Exchanges Hold Talks on New Joint Trading System; Investors could Gain New Access to Equity Floors", Investment Dealers' Digest Inc., Firms & Exchange, Dec. 7, 1992, pp. 6.
Lux, Hal, "Vision Test; Can Steve Wunsch Build a Better Exchange? ", Investment Dealers' Digest Inc., Cover Story, Sep. 17, 1990, pp. 2-9.
Lyons, Richard K., "Foreign Exchange vol. Sound and Fury Signifying Nothing?", 1 page.
Macconnell, Sean, "Video Stars for New Pastures", The Irish Times, City Edition, Home News, Jul. 24, 1993, pp. 2-3.
Macrae, Desmond, "Derivatives: Globex's Bright if Distant Future", Global Investor, vol. 24, No. 2, Apr. 1993, 6 pages.
Madden, Barley J., "Structural Changes in Trading Stocks", The Journal of Portfolio Management, The Market, Fall, 1993, pp. 11.
Madhavan, Ananth, "Trading Mechanisms in Securities Markets", The Journal of Finance, American Finance Association, vol. 47, No. 2, Jun. 1992, pp. 607-641.
Maines, John, "Cowboys and Camcorders", American Demographics, Jun. 1988, pp. 49-50.
Malz, Allan M., "Using Option Prices to Estimate Realignment Probabilities in the European Monetary System: The Case of Sterling-Mark", Journal of International Money and Finance, vol. 15, No. 5, 1996, pp. 717-748.
Markoff, John, "Breaking up Computer Traffic Jams", The Orange County Register, May 25, 1989, pp. 1-2.
"Flowers Shipped 'Around the Clock' Through Holland's Famous High-tech Auction," Business Wire Inc., Aug. 9, 1990, 2 pages.
"Flowers are Staple of Dutch Auction," Gazette News Services, Phoenix Newspapers, Inc., Aug. 17, 1990, 2 pages.
"Free Form Order Entry Would Use the Following Syntax: Quotes Are Used Around Keywords, Which Are Not Variables," 1982, 1 page.
"Freight Futures Contract," INTEX, The International Futures Exchange( Bermuda) Ltd, pp. 00327-00338.
"From Toronto to Tokyo and Beyond: The Advent of Computerized Trading," The Equity Markets Today, pp. 78-97.
"FT Version 4.1 Specification," Jan. 30, 1992, FT Version 4.1, Independent Data Services Inc., 14 pages.
"Function (Mathematics)," Wikipedia, Jun. 15, 2006, <http://en.wikipedia.org/wiki/Mathematical_Function>, pp. 1-9.
"Fundamental Analysis," TradeTrek.com, <http://www.tradetrek.com/fundAnalysis/default.asp>, Oct. 8, 2004, 1 page.
"Futures Trading, Takes a Giant Step into the Computer Age," INTEX, pp. 00495.1.

(56) References Cited

OTHER PUBLICATIONS

"GL LIFFE CONNECT for Futures User Guide," GL Trade, London, Jan. 1999, v4.50 Beta, 24 pages.
"GL LIFFE CONNECT for Futures User Guide," Screenshots, Feb. 1999, 5 pages.
"GL Spreadmatrix," GL Product Information, GL Trade, Jan. 2001, pp. 20/30-21/30.
"GL Trade Checklist: GL LIFFE CONNECT for Futures Installation Requirements Form", GL Trade, Jan. 1999, 4 pages.
"GL Trade Pad," GL Trade, Feb. 9, 1999, pp. 25/30-30/30.
"GL Trade, LIFFE CONNECT for Futures," User Guide, Jun. 1999, v4.51, 56 pages.
"GL Trade, LIFFE CONNECT for Futures," User Guide, Jun. 1999, v4.60, 57 pages.
"GL Trade, LIFFE CONNECT for Futures," User Guide, Mar. 1999, v4.50, 40 pages.
"GL Trade, LIFFE CONNECT for Futures," Tradepad, User Guide, Jun. 1999, v4.51, 8 pages.
"GL Trade: User Guide For Globex2", GL Trade, Apr. 1999, 203 pages.
"GL Win and Related Software," Users Guide, GL Trade, 372 pages.
"GL Win et Logiciels Complementaires," Guide d'utilisation, GL Trade, 24 pages.
"GLOBEX Member Handbook," GLOBEX, Chicago Mercantile Exchange, Chicago, IL, Jun. 1992, 75 Pages.
"GLOBEX Partner Exchange," A GLOBEX Future Exchange, MATIF/SFE/NYMEX/Chicago Mercantile Exchange, 4 pages.
"GLOBEX Status Manual: User Manual," GLOBEX, 1993, Chicago Mercantile Exchange, Chicago, IL, 118 pages.
"Globex: User Guide," Reuters, Financial Media Professional, Jan. 1997, 263 pages.
"GLOBEX: Expanding Futures and Options Trading Around the World, Around the Clock," Chicago Mercantile Exchange, Chicago, IL, 25 pages.
"GLOBEX2 : The Future is Today," Chicago Mercantile Exchange, Chicago, IL, 6 pages.
"Glossary of Terms," National Thoroughbred Racing Association, <http://www.ntra.com/news.asp?type=playthehorses&id=4797>, 3 pages.
"Good-bye to the Pits?," Financial World, Feb. 28, 1983, pp. 35-37.
"High Tech in the Cattle Market," Bulldog, Omaha World-Herald Company, Feb. 11, 1985, 1 page.
"How Are the Markets Displayed?", CBOT, 1982, 1 page.
"IEM FAQ," Iowa Electronic Markets, <http://www.biziowa.edu/iem/faq.html>, 11 pages.
"Implied Order Masking and Stepping Ahead," Jan. 1998, pp. 1-2.
"Implied Orders (Summary Version)," Business Requirements, Oct. 29, 1996, 21 pages.
"Individual Announces Revolutionary 'Dutch Auction' System for Ads on NewsPage Web service," Business Wire, Jul. 24, 1995, 2 pages.
"Insight—on the news: Airline Seats May Go on the Auction Block," The BusinessWeek Newsletter for information Executives—Business Briefing, Dec. 4, 1989, 2 pages.
"Instinet Corp. Accepts Offer From Reuters After It Is Sweetened," The Wall Street Journal, Dow Jones & Co., Inc., Nov. 11, 1986, 2 pages.
"Institutional Investors Begin Using Electronic Bond Trading," PR Newswire, PR Newswire Association, Inc., Apr. 8, 1998, 2 pages.
"Inter-Commodity Spread Orders for Nymex Access," New York Mercantile Exchange, 2 pages.
"INTEX Comes to Agreement With INTEX Systems," Wall Street Letter, Nov. 7, 1983, p. 3.
"INTEX Enters Final Testing Stage," Wall Street Letter, Aug. 30, 1982, pp. 7.
"INTEX . . . Fast, Fair, Accurate," INTEX, The International Futures Exchange (Bermuda) Ltd., 4 pages.
"Intex Goes with UST-bonds and Dollar Gold", Exchange Focus, 2 pages.
"INTEX Opening Schedule Update," The International Futures Exchange (Bermuda) Ltd., Bermuda, 1983, 1 page.
"INTEX Trading Memberships," CBOT, Defendants' Exhibit 2345, 2 pages.
"INTEX Trading System: Trading Screen, Market Summary, Spreads," Screenshots, 1983, 2 pages.
"INTEX Update for Members," The International Futures Exchange (Bermuda) Ltd., Nov. 1982, 14 pages.
"INTEX Update for Members," The International Futures Exchange (Bermuda) Ltd., Sep. 15, 1982, 2 pages.
"INTEX User's Guide", CBOT, Table of Contents, Defendants' Exhibit 2162, 3 pages.
"INTEX, Security Pacific Sign Agreement," Wall Street Letter, Aug. 2, 1982, p. 3.

\* cited by examiner

| Combination No. | Combination Description | | | Code |
|---|---|---|---|---|
| 1 | C1 : 0 | C2 : 0 | C3 : 0 | AA |
| 2 | C1 : 1 | C2 : 0 | C3 : 0 | AB |
| 3 | C1 : 2 | C2 : 0 | C3 : 0 | AC |
| 4 | C1 : 3 | C2 : 0 | C3 : 0 | AD |
| 5 | C1 : 4 | C2 : 0 | C3 : 0 | AE |
| 6 | C1 : 5 | C2 : 0 | C3 : 0 | AF |
| 7 | C1 : 0 | C2 : 1 | C3 : 0 | AG |
| 8 | C1 : 1 | C2 : 1 | C3 : 0 | AH |
| 9 | C1 : 2 | C2 : 1 | C3 : 0 | AI |
| 10 | C1 : 3 | C2 : 1 | C3 : 0 | AJ |
| 11 | C1 : 4 | C2 : 1 | C3 : 0 | AK |
| 12 | C1 : 0 | C2 : 2 | C3 : 0 | AL |
| 13 | C1 : 1 | C2 : 2 | C3 : 0 | AM |
| 14 | C1 : 2 | C2 : 2 | C3 : 0 | AN |
| 15 | C1 : 3 | C2 : 2 | C3 : 0 | AO |
| 16 | C1 : 0 | C2 : 3 | C3 : 0 | AP |
| 17 | C1 : 1 | C2 : 3 | C3 : 0 | AQ |
| 18 | C1 : 2 | C2 : 3 | C3 : 0 | AR |
| 19 | C1 : 0 | C2 : 4 | C3 : 0 | AS |
| 20 | C1 : 1 | C2 : 4 | C3 : 0 | AT |
| 21 | C1 : 0 | C2 : 5 | C3 : 0 | AU |
| 22 | C1 : 0 | C2 : 0 | C3 : 1 | AV |
| 23 | C1 : 1 | C2 : 0 | C3 : 1 | AW |
| 24 | C1 : 2 | C2 : 0 | C3 : 1 | AX |
| 25 | C1 : 3 | C2 : 0 | C3 : 1 | AY |
| 26 | C1 : 4 | C2 : 0 | C3 : 1 | AZ |
| 27 | C1 : 0 | C2 : 1 | C3 : 1 | BA |
| 28 | C1 : 0 | C2 : 2 | C3 : 1 | BB |
| 29 | C1 : 0 | C2 : 3 | C3 : 1 | BC |
| 30 | C1 : 0 | C2 : 4 | C3 : 1 | BD |
| 31 | C1 : 1 | C2 : 1 | C3 : 1 | BE |
| 32 | C1 : 1 | C2 : 2 | C3 : 1 | BF |
| 33 | C1 : 1 | C2 : 3 | C3 : 1 | BG |
| 34 | C1 : 2 | C2 : 1 | C3 : 1 | BH |
| 35 | C1 : 2 | C2 : 2 | C3 : 1 | BI |
| 36 | C1 : 3 | C2 : 1 | C3 : 1 | BJ |
| 37 | C1 : 0 | C2 : 0 | C3 : 2 | BK |
| 38 | C1 : 1 | C2 : 0 | C3 : 2 | BL |
| 39 | C1 : 2 | C2 : 0 | C3 : 2 | BM |
| 40 | C1 : 3 | C2 : 0 | C3 : 2 | BN |
| 41 | C1 : 0 | C2 : 1 | C3 : 2 | BO |
| 42 | C1 : 0 | C2 : 2 | C3 : 2 | BP |
| 43 | C1 : 0 | C2 : 3 | C3 : 2 | BQ |
| 44 | C1 : 1 | C2 : 1 | C3 : 2 | BR |
| 45 | C1 : 1 | C2 : 2 | C3 : 2 | BS |
| 46 | C1 : 2 | C2 : 1 | C3 : 2 | BT |
| 47 | C1 : 0 | C2 : 0 | C3 : 3 | BU |
| 48 | C1 : 1 | C2 : 0 | C3 : 3 | BV |
| 49 | C1 : 2 | C2 : 0 | C3 : 3 | BW |
| 50 | C1 : 0 | C2 : 1 | C3 : 3 | BX |
| 51 | C1 : 0 | C2 : 2 | C3 : 3 | BY |
| 52 | C1 : 1 | C2 : 1 | C3 : 3 | BZ |
| 53 | C1 : 0 | C2 : 0 | C3 : 4 | CA |
| 54 | C1 : 1 | C2 : 0 | C3 : 4 | CB |
| 55 | C1 : 0 | C2 : 1 | C3 : 4 | CC |
| 56 | C1 : 0 | C2 : 0 | C3 : 5 | CD |

FIG. 4

COMPRESSION OF VALUE CHANGE DATA

REFERENCE TO RELATED APPLICATIONS

This application is a continuation under 37 C.F.R. § 1.53(b) of U.S. patent application Ser. No. 14/587,467 filed Dec. 31, 2014, now U.S. Pat. No. 11,315,181, the entire disclosure of which is incorporated by reference in their entirety.

BACKGROUND

Numerous types of financial products are routinely traded on financial exchanges. When processing orders to trade such products, it may be desirable to validate prices contained in those orders relative to historic price activity. Such price validation may also be desirable when settling various types of financial products. Validating prices against raw historic price data can consume significant data processing resources, however. Such raw historic price data may also consume significant data storage resources. For these and other reasons, there remains a need for improved methods and systems for compressing price data.

SUMMARY

This Summary is provided to introduce a selection of concepts in a simplified form that are further described below in the Detailed Description. This Summary is not intended to identify key features or essential features of the invention.

In some embodiments, a computer system may calculate a price change value for each of times $t(m,1)$ through $t(m,N)$ for which there is data representing a price value. The times $t(m,1)$ through $t(m,N)$ may be during a time frame $F(m)$. The computer system may identify, for each of the times $t(m,1)$ through $t(m,N)$ for which a price change value is calculated, a price change category corresponding to a range of price changes that includes that price change value. Each identified category may be a member of a group of price change categories, with each of the price change categories in the group corresponding to a different range of price changes. The computer system may select, from a code table comprising codes for each of multiple different combinations of price change categories, a code for time frame $F(m)$ corresponding to the price change categories identified for the times $t(m,1)$ through $t(m,N)$. The computer system may store the code selected for time frame $F(m)$. The computer system may then repeat these steps for multiple iterations, each iteration corresponding to a different value of m and a successively later time frame.

In some embodiments, a computer system may calculate a price change $\Delta P(q)$. The price change $\Delta P(q)$ may correspond to a time $t(q)$ and be based on a difference between a price corresponding to the time $t(q)$ and a price corresponding to a previous time $t(q-1)$. The computer system may identify a price change category for $\Delta P(q)$. The identified category may be a member of a group of price change categories, with each of the price change categories in the group corresponding to a different range of price changes, and with the price change category identified for $\Delta P(q)$ corresponding to a range of price changes that includes $\Delta P(q)$. The computer system may store a code corresponding to the price change category identified for $\Delta P(q)$. The computer system may repeat these steps for multiple iterations, with each iteration corresponding to a successively incremented value of q and a successively later time.

Embodiments include, without limitation, herein-described methods for compressing and/or otherwise processing price data, computer systems configured to perform such methods, and non-transitory computer-readable media storing instructions executable by a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

FIG. 4 is a code table according to some embodiments.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment, and/or an embodiment combining software and hardware aspects. Furthermore, such aspects may take the form of a computer program product embodied as one or more non-transitory computer-readable storage media having computer-readable program code, or instructions, stored in or on that media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, FLASH memory, and/or any combination thereof. The term "computer-readable medium" or "computer-readable storage medium" could also include an integrated circuit or other device having hard-coded instructions (e.g., logic gates) that configure the device to perform one or more operations.

Aspects of method steps described in connection with one or more embodiments may be executed by one or more processors associated with a computer system (such as but not limited to exchange computer system 100 described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks performed by remote processing devices that are linked through a communications network. In a distributed computing environment, program modules may be located in both local and remote computer storage media including memory storage devices.

Exemplary Operating Environment

Figure 1:
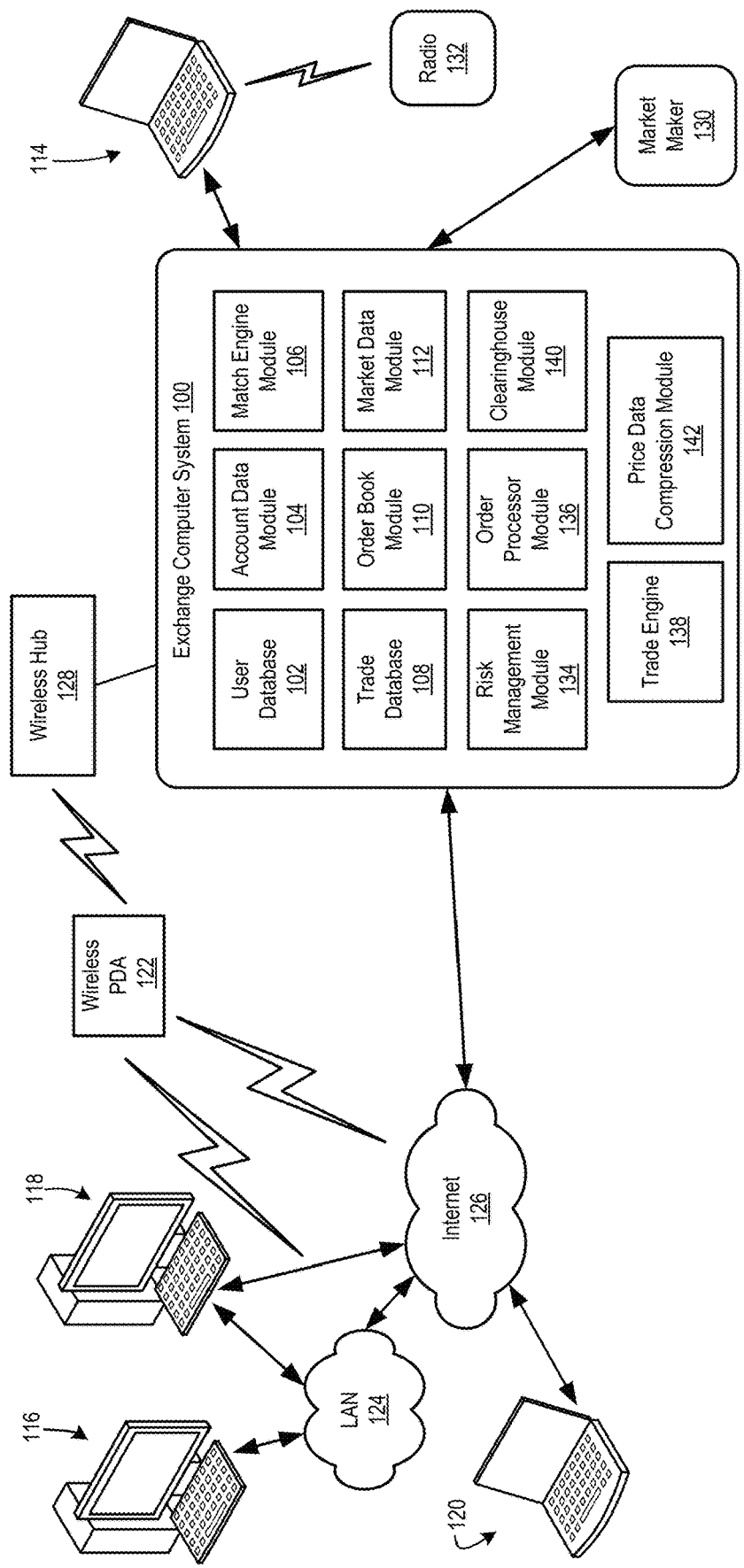
FIG. 1 shows an exemplary trading network environment for implementing systems and methods according to some embodiments.

Aspects of at least some embodiments can be implemented with computer systems and computer networks that allow users to communicate trading and other information. An exemplary trading network environment for implementing systems and methods according to some embodiments is shown in FIG. 1. The implemented systems and methods can include systems and methods, such as are described herein, that facilitate data processing and other activities associated with compressing price data.

Computer system 100 can be operated by a financial product exchange and configured to perform operations of the exchange for, e.g., trading and otherwise processing data relating to various financial products. Financial products of the exchange may include, without limitation, futures contracts, options on futures contracts, other types of options, and other types of derivative contracts. Financial products traded or otherwise processed by the exchange may also include over-the-counter (OTC) products such as OTC forwards, OTC options, OTC swaps, etc. Financial products traded through the exchange may also or alternatively include other types of financial interests, including without limitation stocks, bonds and/or other securities (e.g., exchange traded funds), foreign currencies, and spot market trading of commodities.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options, and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out operations of a clearinghouse of the exchange that operates computer system 100. Module 140 may receive data from and/or transmit data to trade database 108 and/or other modules of computer system 100 regarding trades involving futures contracts and other financial products traded through the exchange that operates system 100. Clearinghouse module 140 may facilitate the financial product exchange (or a clearinghouse of the exchange) acting as one of the parties to every traded contract or other product. For example, computer system 100 may match an offer by party A to sell a futures contract, an option, or other exchange-traded financial product with a bid by party B to purchase a like exchange-traded financial product. Module 140 may then create an exchange-traded financial product between party A and the exchange clearinghouse and a second exchange-traded financial product between the exchange clearinghouse and party B. Module 140 may similarly create offsetting contracts when creating contracts as a result of an option exercise and/or may select option grantors to fulfill obligations of exercising option holders. Module 140 may also be configured to perform other clearinghouse operations. As a further example, module 140 may maintain performance bond data with regard to clearing members and/or trading customers. As part of such operations, module 140 may store and maintain data regarding the values of various futures contracts and other interests, determine mark-to-market and final settlement amounts, confirm receipt and/or payment of amounts associated with performance bond accounts, confirm satisfaction of delivery and other final settlement obligations, etc. Module 140 may also perform data processing operations associated with settling and clearing of financial products that were not traded through exchange computer system 100. Examples of such products include OTC forwards, swaps, and other products that may be executed bilaterally between the parties and subsequently submitted to an exchange for clearing and/or other processing.

Exchange computer system 100 may include a price data compression module 142. Various operations performed by module 142 in at least some embodiments are further described below.

Each of modules 102 through 142 could be implemented as separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-142). When one or more of modules 102 through 142 are implemented as separate computers in a networked environment, those computers may be part of a local area network, a wide area network, and/or multiple interconnected local and/or wide area networks.

Exchange computer system 100 may also communicate in a variety of ways with devices that may be logically distinct from computer system 100. For example, computer device 114 is shown directly connected to exchange computer system 100. Exchange computer system 100 and computer device 114 may be connected via a T1 line, a common local area network (LAN), or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124 and may communicate with exchange computer system 100 via LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links, or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish, or any other device for connecting a computer device to the Internet. Computers 116, 118, and 120 may communicate with each other via the Internet 126 and/or LAN 124.

One or more market makers 130 may maintain a market by providing continual bid and offer prices for a derivative, security, or other type of product to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems, regulatory systems, and fee systems.

The operations of computer devices and systems shown in FIG. 1 and described herein may be controlled by computer-executable instructions stored on one or more non-transitory computer-readable media. For example, computer device 116 may include computer-executable instructions for receiving market data from exchange computer system 100 and displaying that information to a user. As another example, module 142 and/or other modules of exchange computer system 100 may include one or more non-transitory computer-readable media storing computer-executable instructions for performing herein-described operations associated with compressing and/or otherwise processing price data.

Of course, numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, exchange computer system 100 (or "computer system 100") receives, stores, generates, and/or otherwise processes data associated with market activity related to a financial product. In at least some embodiments, computer system 100 compresses price data associated with a financial product. In particular, computer system 100 accesses data that indicates prices for a financial product at each of multiple times, generates data representing changes in prices, and stores codes representing that generated price change data. The codes may require substantially less storage resources than the initial price data but retain relevant information that may be used for subsequent price validation and for other purposes. Processing of the codes when performing price validation and/or other operations may also consume fewer data processing resources than would be needed to perform those operations using the initial price data.

Figure 2:
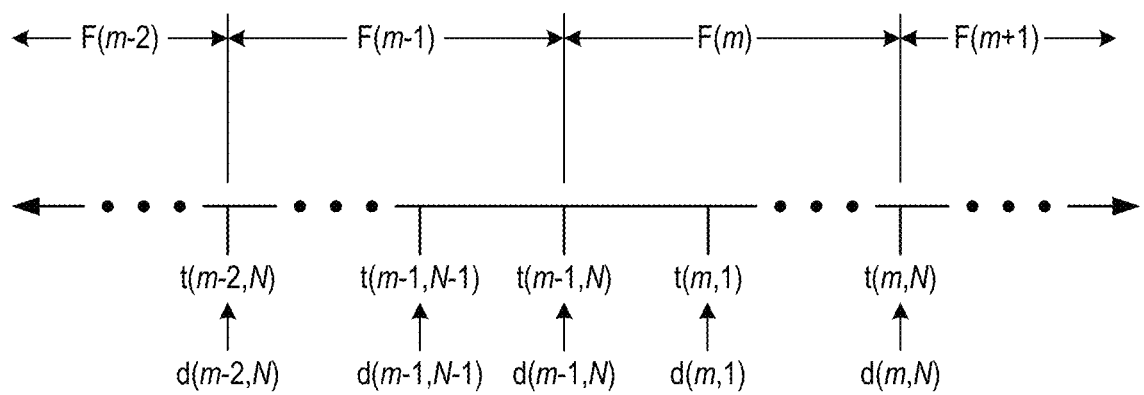
FIG. 2 is a time line showing times, time frames, and data for trading activities associated with a hypothetical financial product.

FIG. 2 is a time line showing times, time frames, and data for trading activities associated with a hypothetical financial product A and that will be used as an example to describe certain embodiments. Financial product A may be a type of futures contract, a type of option, a type of OTC forward, a type of OTC option, a type of security, or other type of financial product. In FIG. 2 and throughout this specification (including the claims), an italicized lowercase letter represents a counter variable (or "counter") having values that, either alone or as part of an arithmetic expression, distinguish between instances of multiple similar elements. For example, "m" is used as a counter in connection with time frames F. The expression F(1), for example, is equivalent to F(m=1), with time frame F(1) being different from time frame F(2). "F(m)" represents the $m^{th}$ time frame F, the expression "F(m−1)" represents the time frame F immediately preceding F(m), the expression "F(m+1)" represents the time frame F immediately following F(m), etc. As another example, "n" is used as a counter to distinguish between times t in a particular time frame F. The $n^{th}$ time in the $m^{th}$ time frame is represented as t(m,n).

Also in FIG. 2 and throughout this specification (including the claims), italicized uppercase letters represent values that remain constant. For example, each time frame F in FIG. 2 includes N times t. In the example of FIG. 2, each time frame F corresponds to a different calendar week, each time t corresponds to a weekday (e.g., one of Monday, Tuesday, Wednesday, Thursday or Friday), and N=5. In other embodiments, times t and time frames F may correspond to different time intervals and N may have a different value. For example, each time frame F may correspond to a particular trading day, each time t may correspond to a particular hour during a particular day, and N may equal 8.

For each of multiple times t throughout multiple time frames F in the example of FIG. 2, a data value d regarding product A trading is stored. Data value d corresponding to the $n^{th}$ time in the $m^{th}$ time frame is represented by d(m,n). In the example of FIG. 2 each data value d indicates either (i) a close of day trading price for instances of product A, or (ii) that no trade price data is available. With regard to possibility (ii), no price data may be available if, e.g., the day corresponding to a particular time t was a holiday or if markets were otherwise closed. With regard to possibility (i), in other embodiments price data may represent another value (e.g., average bid-ask midpoint over a portion of a period corresponding to time t).

Figure 3A:
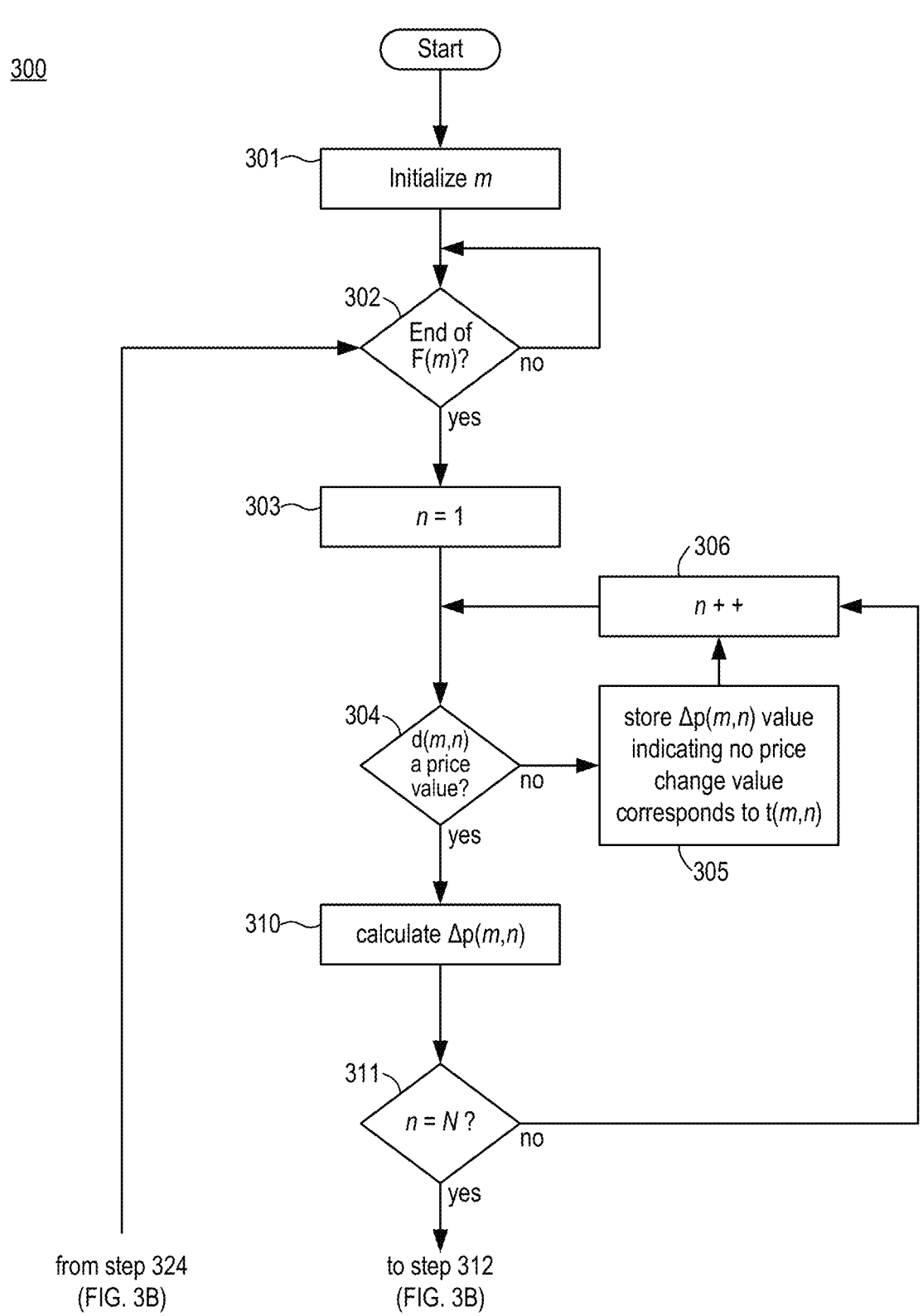
FIGS. 3A and 3B are a flow chart showing operations performed by a computer system executing an algorithm according to some embodiments.
Figure 3B:
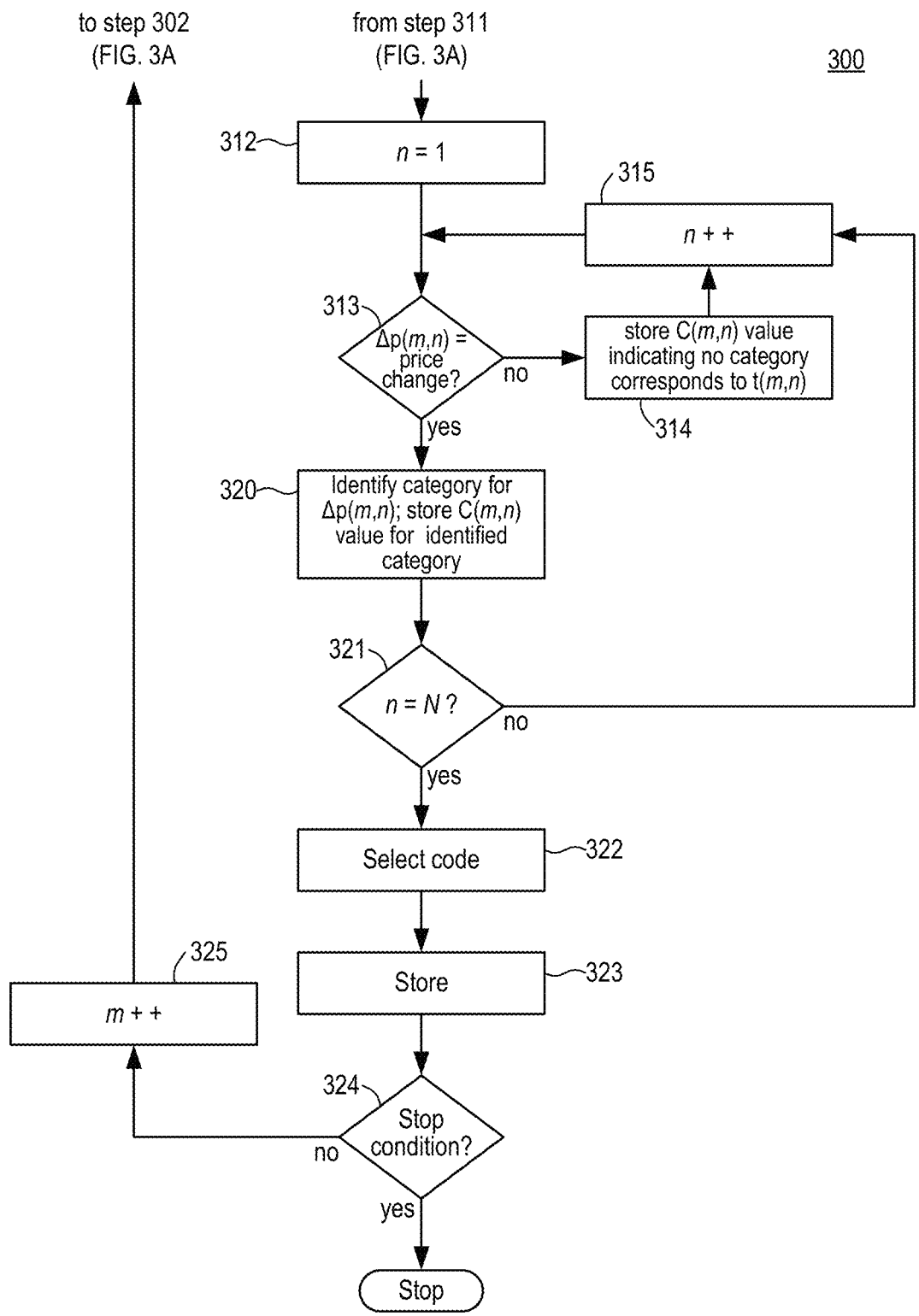

FIGS. 3A and 3B are a flow chart showing operations in an algorithm 300 performed by computer system 100, according to some embodiments, in connection with compressing price data such as may be contained in data values d in FIG. 2. In some embodiments, the operations in FIGS. 3A and 3B may be performed by price data compression module 142. In other embodiments, however, some or all of these operations may be performed by other modules of computer system 100 and/or by modules of one or more other computer systems.

Beginning in step 301 (FIG. 3A), module 142 initializes the m counter by, e.g., setting m=1. In step 302, module 142 determines if the end of time frame F(m) has been reached. If not, and as shown by the "no" branch, step 302 is repeated until the end of time frame F(m) has occurred. If the end of time frame F(m) has been reached, and as shown by the "yes" branch, module 142 continues to step 303 and initializes the n counter.

In step 304, module 142 analyzes data value d(m,n) corresponding to time t(m,n). In particular, module 142 evaluates whether data value d(m,n) is a price corresponding to time t(m,n) or whether data value d(m,n) indicates that there is no price corresponding to time t(m,n). If data value d(m,n) is a price, and as shown by the "yes" branch, module 142 proceeds to step 310. In step 310, module 142 calculates a price change value Δp(m,n) representing an amount by which the price corresponding to time t(m,n) has changed relative to the most recent previous time t for which there was also a corresponding price. In some embodiments, module 142 calculates a price change value as an absolute value of a difference between the price corresponding to time t(m,n) and the price corresponding to the most recent previous time t for which there was a corresponding price.

The following is an example of operations performed in connection with step 310 according to some embodiments. If t(m,n) is t(m,1) in FIG. 2, module 142 would determine whether data value d(m−1,N) corresponding to time t(m−1, N) is a price or an indication that there is no price corresponding to time t(m−1,N). If data element d(m−1,N) is a price, then module 142 calculates a price change value for time t(m,1) as the absolute value of the difference between the prices d(m,1) and d(m−1,N), i.e., Δp(m,n)=|d(m,1)−d(m−1,N)|. If data value d(m−1,N) indicates there is no price corresponding to time t(m−1,N), module 142 determines whether data value d(m−1,N−1) corresponding to time t(m−1,N−1) is a price or an indication that there is no price corresponding to time t(m−1,N−1). If data value d(m−1, N−1) is a price, then module 142 calculates Δp(m,n)=|d(m,1)−d(m−1,N−1)|. If data value d(m−1,N−1) indicates there is no price corresponding to time t(m−1,N−1), then each of d(m−1,N−2), etc., would be checked until a price is found, with Δp(m,n) then calculated as Δp(m,n)=|d(m,1)−<found price>|.

In other embodiments, module 142 may calculate a price change without computing an absolute value, or in some other manner.

After calculating Δp(m,n) in step 310, module 142 continues to step 311 and determines whether n equals N. If so, and as indicated by the "yes" branch, module 142 continues to step 312 (FIG. 3B). Step 312 is described below. If n does not equal N, and as indicated by the "no" branch from step 311, module 142 continues to step 306. In step 306, the n counter is incremented by 1, and module 142 then repeats step 304.

If module 142 determines in step 304 that data value d(m,n) indicates that there is no price corresponding to time t(m,n), and as shown by the "no" branch from step 304, module 142 continues to step 305. In step 305, module 142 stores a Δp(m,n) value indicating that there is no price change value corresponding to time t(m,n). Module 142 then continues from step 305 to step 306.

As mentioned above, module 142 continues to step 312 upon determining in step 311 that n equals N. In step 312, and as seen in FIG. 3B, module 142 resets the n counter to 1. Module 142 then continues to step 313 and determines whether the Δp(m,n) value is a price change value (see above discussion of step 310) or an indication that there is no price change value corresponding to time t(m,n) (see above discussion of step 305). If Δp(m,n) is a price change value, and as indicated by the yes branch from step 313, module 142 continues to step 320.

In step 320, module 142 identifies a price change category corresponding to the price change value Δp(m,n). In some embodiments, module 142 performs step 320 by accessing data storing a table of price change categories. Each of the categories in the table may correspond to a different range of possible price change values. Module 142 may identify the category corresponding to the price change value Δp(m,n) by identifying the category corresponding to the range that includes Δp(m,n). Upon identifying a price change category, module 142 stores the value of the identified category, which category corresponds to time t(m,n), as C(m,n).

The following is an example of operations performed in connection with step 320 according to some embodiments. If the price change value Δp(m,n) is 2.87, and if the price change categories are as shown below in Table 1, module 142 would identify category 2.

TABLE 1

| price change category | range of price change values |
|---|---|
| 1 | 0 ≤ price change < 1.5 |
| 2 | 1.5 ≤ price change < 3 |
| 3 | 3 ≤ price change |

From step 320, module 142 continues to step 321 and determines if n is equal to N. If so, and as indicated by the "yes" branch, module 142 continues to step 322. Step 322 is discussed below. If n does not equal N, and as shown by the "no" branch, module 142 continues from step 321 to step 315. In step 315, the n counter is incremented by 1 and module 142 then repeats step 313.

If module 142 determines in step 313 that data value Δp(m,n) indicates that there is no price change value corresponding to time t(m,n), and as indicated by the "no" branch from step 313, module 142 continues to step 314. In step 314, module 142 stores a C(m,n) value indicating that there is no category corresponding to time t(m,n). From step 314, module 142 continues to step 315.

As mentioned above, module 142 continues to step 322 upon determining that n equals N. In step 322, module 142 selects a code for time frame F(m). The selected code corresponds to the price change categories identified for the times t(m,1) through t(m,N). In at some embodiments, module 142 selects a code from a code table that comprises a separate code for each of multiple different combinations of price change categories, for each of multiple different combinations of price change categories and absence of price change category for one or more times, and for the absence of price change categories for all times. As can be appreciated from the above discussion of steps 320 and 314, data values C(m,1) through C(m,N) indicate all the categories that may have been identified in connection with frame F(m), as well as the number of times t during time frame F(m) for which a category may not have been identified. In at least some embodiments, the code table includes a different code for all possible combinations of category(ies) and absence(s) of a category that could be indicated by the C(m,1) through C(m,N) values.

The total number of combinations in a code table that includes all possible combinations of category(ies) and absence(s) of category would be equal to $$\frac{(J+N)!}{J!N!},$$

where J is the total number of categories and N is the number of times in each time frame. In an embodiment in which N equals 5 (see above discussion of FIG. 2) and J equals 3 (see Table 1), the code table would include 56 entries. FIG. 4 is an example of a code table 400 according to such an embodiment. Each row in table 400 corresponds to a different combination of identified categories and/or absence of identified categories. Each category is described in the second field of the row, with the number after "C1:" indicating the number of times t in a time frame for which category 1 was identified, with the number after "C2:" indicating the number of times t in a time frame for which category 2 was identified, and with the number after "C3:" indicating the number of times t in a time frame for which category 3 was identified. The number of times in a time frame for which no category was identified can be derived by summing the C1, C2 and C3 numbers and subtracting that sum from N (with N=5 in the present example). For example, row 32 corresponds to a combination of category 1 identified for 1 time t in a time frame F, category 2 identified for two times t in that time frame F, category 3 identified for 1 time t in that time frame F, and no category identified for one time t in that time frame F. The code that would be selected for this combination is "BF."

Table 2 provides several examples of codes that would be selected from table 400 based on various combinations of C(m,1) through C(m,N) values, with "<none>" used in Table 2 to represent a data value indicating absence of a corresponding category.

TABLE 2

| Example C(m, 1) through C(m, N) values | Code |
|---|---|
| C(m, 1) = <none>; C(m, 2) = 1; C(m, 3) = 1; C(m, 4) = 3; C(m, 5) = 1 | AY |
| C(m, 1) = 3; C(m, 2) = 1; C(m, 3) = <none>; C(m, 4) = 1; C(m, 5) = 1 | AY |
| C(m, 1) = 1; C(m, 2) = 1; C(m, 3) = 2; C(m, 4) = 1; C(m, 5) = 2 | AO |
| C(m, 1) = <none>; C(m, 2) = <none>; C(m, 3) = <none>; C(m, 4) = <none>; C(m, 5) = 3 | AV |
| C(m, 1) = 3; C(m, 2) = 3; C(m, 3) = 2; C(m, 4) = 3; C(m, 5) = 1 | BZ |

As seen in the first two rows of Table 2, the codes in the embodiment of code table 400 do not depend on the order in which categories or absences of categories appear in a particular combination. When trade price change statistics are reconstructed from such codes, and as described below, only the number of occurrences of categories or absences of categories are provided. Although this results in some loss of information, it allows greater efficiency by storing information most relevant for certain purposes. For example, the precise order of times in which trade prices may have changed by certain amounts during a particular time period may be less important, for purposes of price validation, than the number of times that price changes were within a certain range. In some embodiments, a code table might include multiple entries for a particular combination so as to permit reconstruction of the order in which price changes corresponding to certain categories occurred.

Returning to FIG. 3B, after selecting a code in step 322, module 142 stores that code in step 323. In some embodiments, module 142 stores that code by appending it to a code previously stored for the preceding time frame F. In step 324, module 142 determines if a stop condition has occurred. In some embodiments, for example, module 142 may be configured to periodically reset parameters of algorithm 300 if a value for counter m has incremented beyond a certain value. As another example, module 142 may be configured in some embodiments to periodically interrupt execution of algorithm 300 and prompt an operator of computer system 100 for input indicating whether execution should continue for further iterations. If a stop condition has occurred, and as shown by the "yes" branch from step 324, module 142 stops performing algorithm 300. If a stop condition has not occurred, and as shown by the "no" branch, module 142 continues to step 325, increments the m counter by 1, and returns to step 302 to start a new iteration of algorithm 300.

Figure 5:
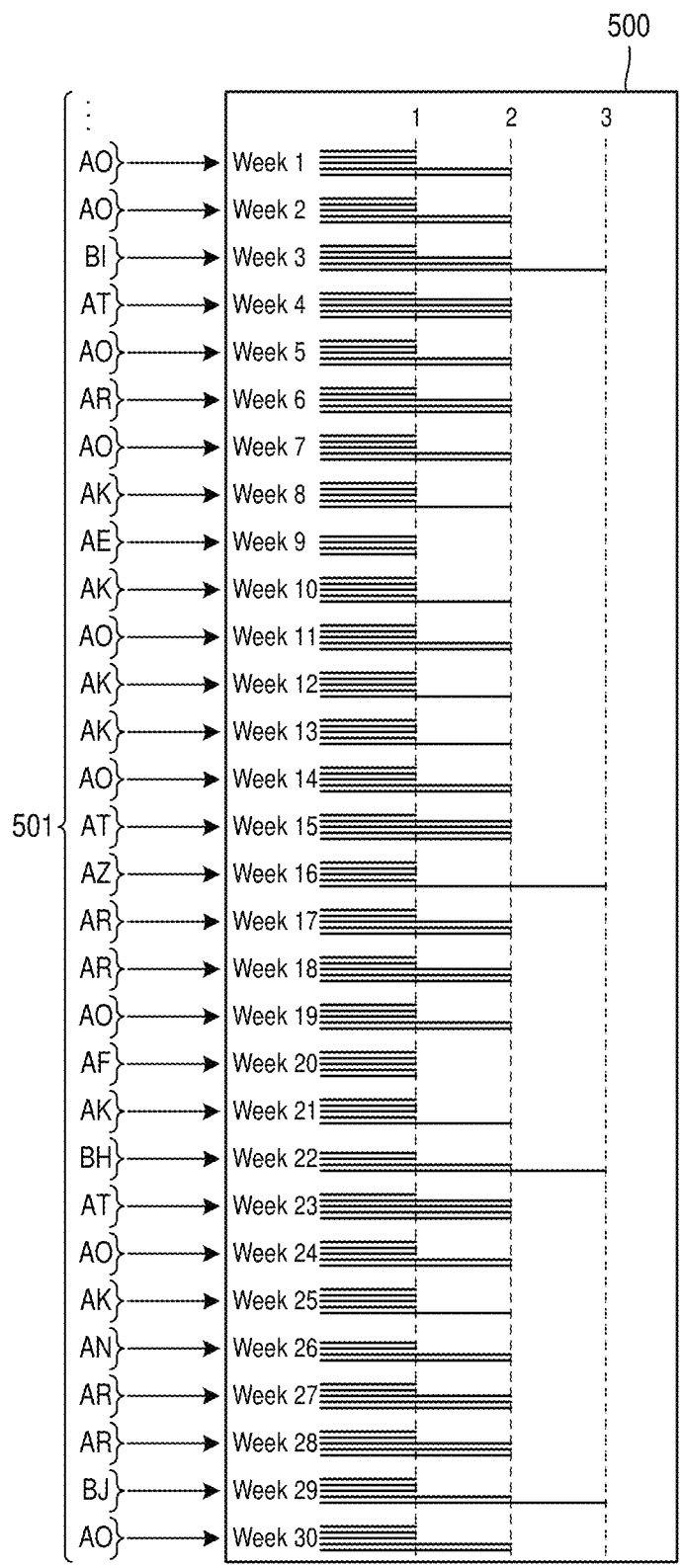
FIG. 5 is an example of a graph that may be created and displayed based on codes generated and stored according to some embodiments.

FIG. 5 is an example of a graph 500 that may be created and displayed based on codes stored by module 142 during operations shown in FIGS. 3A and 3B. The example of graph 500 assumes that code table 400 was used to store a set 501 of appended codes. Computer system 100 may create graph 500 by sequentially reading codes from set 501, decoding the codes based on table 400, then generating vertical lines based on the combination of price change categories corresponding to each of the decoded codes. For example, the rightmost portion of set 501 includes the code "AO" that corresponds to week 30. As seen in FIG. 4, AO represents a combination, during a single time frame F, of three times t for which price change category 1 was identified and two times t for which price change category 2 was identified. Accordingly, the week 30 portion of graph 500 includes three lines indicating category 1 price change levels and two lines indicating category 2 price change levels. Other portions of set 501 can be decoded in a similar manner, as shown in FIG. 5, to generate portions of graph 501 representing weeks 29 through 1.

Graph 500 is only one example of a way in which compressed data resulting from algorithm 300 can be displayed. Other formats can be used, and data can be displayed for more or fewer time frames F. The compressed data resulting from algorithm 300 can also be used in other ways, as discussed below in connection with FIG. 8.

Figure 6:
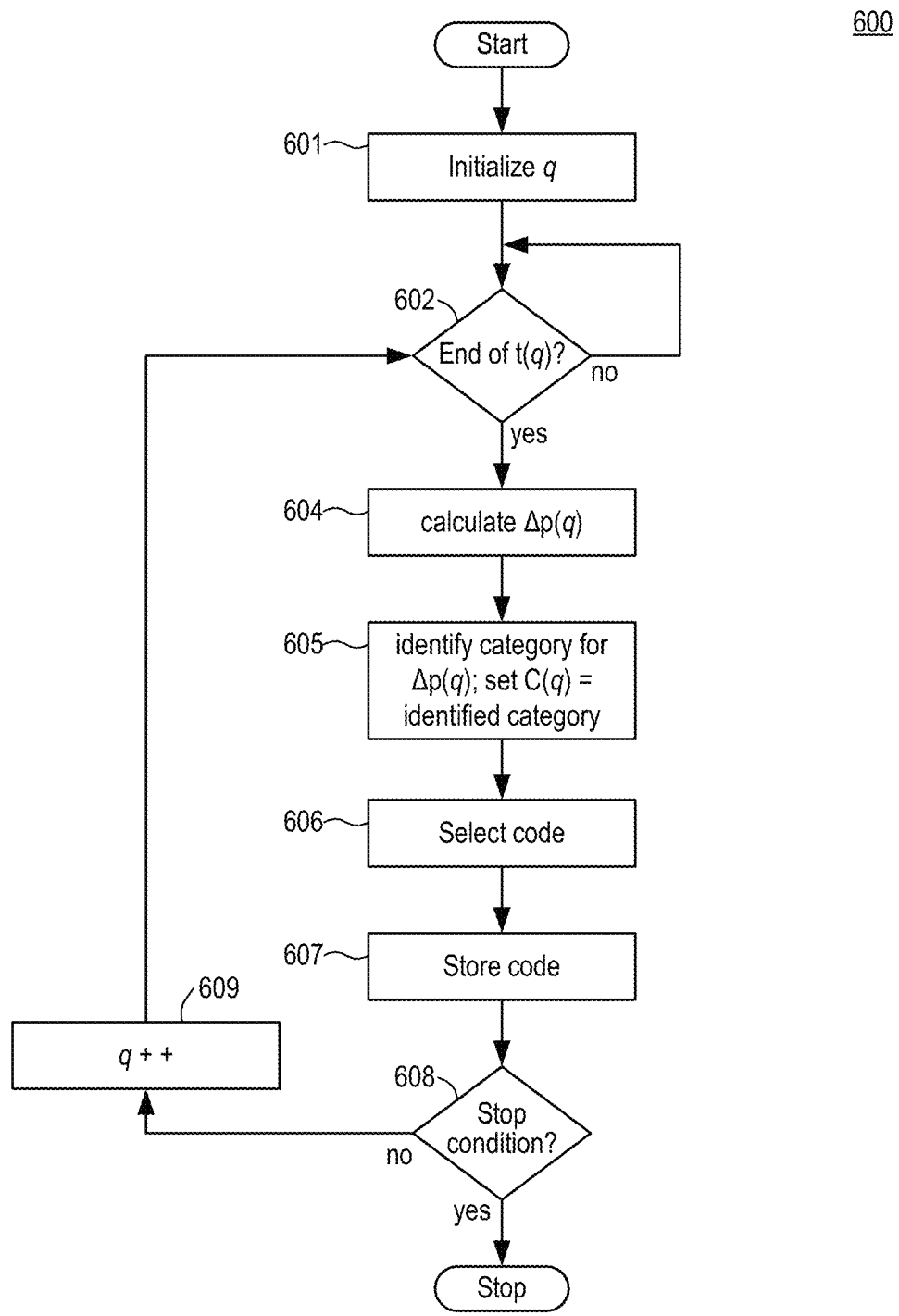
FIG. 6 is a flow chart showing operations performed by a computer system executing an algorithm according to some additional embodiments.

FIG. 6 is a flow chart showing operations in an algorithm 600 performed by module 142 according to some alternate embodiments. Similar to algorithm 300, algorithm 600 may be executed to compress price data by analyzing price data associated with a specific financial product, generating data based on that analysis, and storing codes based on that generated data. Unlike algorithm 300, however, times t are not grouped into time frames for purposes of algorithm 600. Instead, codes are selected for individual times t. Moreover, algorithm 600 is only performed with regard to times for which price data is available.

The counter q will be used to distinguish between different times t for purposes of algorithm 600. A data value associated with a time t(q), represented as d(q), may be a price corresponding to time t(q). As with algorithm 300, times t in algorithm 600 may correspond to different trading days, to different hours within trading days, or to other time periods.

Figure 7:
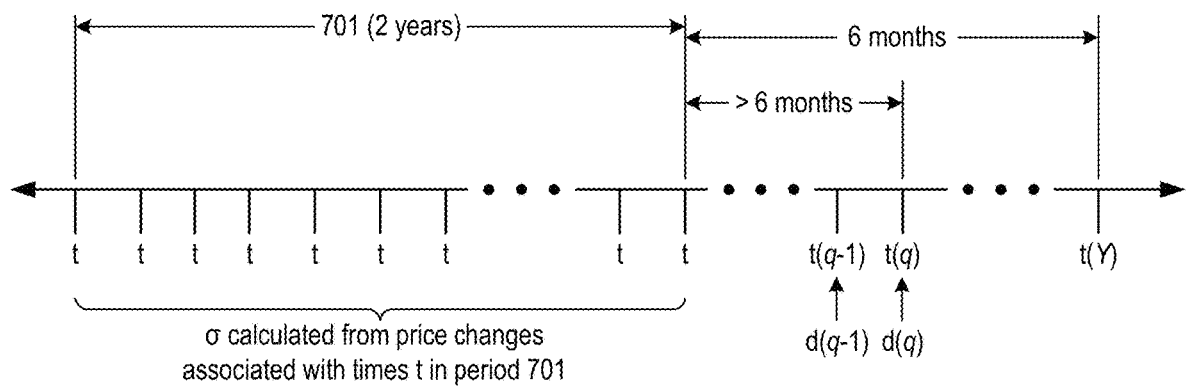
FIG. 7 is a time line showing a relationship, according to some embodiments, between times for which price data is compressed and times from which price data is used to compute a parameter used in the compression.

In some embodiments, price changes are categorized in algorithm 600 based on the relationship to a standard deviation calculated from price change values corresponding to previous times. The time period that includes those previous times may vary in different embodiments. As but one example, a standard deviation could be calculated based on price change values for times t over a two year preceding period. That standard deviation could then be recalculated at periodic intervals (e.g., every 6 months). This is shown in FIG. 7. In the example of FIG. 7, algorithm 600 is currently being performed with regard to time t(q). The standard deviation value a used in algorithm 600 is a standard deviation of price changes corresponding to times t in a two year time span 701. Time t(q) is less than six months from the end of time period 701. At a subsequent time t(Y), the standard deviation a is recalculated using price change values for times t in the two year period that ends on t(Y). That new value of a is then used when algorithm 600 is performed with regard to times after t(Y) and before the next a recalculation.

Turning to FIG. 6, module 142 initializes counter q in step 601. In step 602, module 142 determines if the end of time t(q) has been reached. If not, and as shown by the "no" branch, step 602 is repeated. If the end of time t(q) has been reached, and as shown by the "yes" branch, module 142 continues to step 604.

In step 604, module 142 calculates a price change value Δp(q) representing an amount by which the price corresponding to time t(q) (data value d(q)) has changed relative to the price corresponding to time t(q−1) (data value d(q−1)). In some embodiments, module 142 calculates a price change by subtracting the price corresponding to time t(q−1) from the price corresponding to time t(q), i.e., Δp(q)=d(q)−d(q−1). In other embodiments, module 142 may calculate a price change value as an absolute value, e.g., Δp(q)=|d(q)−d(q−1)|, or in some other manner.

Module 142 then continues from step 604 to step 605. In step 605, module 142 identifies a price change category corresponding to price change value Δp(q). In some embodiments, module 142 performs step 605 by accessing data storing a table of price change categories. Each of the categories in the table corresponds to a different range of possible price change values. Each of those ranges may be quantified in terms of a standard deviation value a computed from price change values corresponding to times in a prior time period, as discussed above. Module 142 identifies the category corresponding to the price change value Δp(q) by identifying the category corresponding to the range that includes Δp(q). Upon identifying a price change category, which corresponds to time t(q), module 142 stores an indicator of that category as C(q).

The following is an example of operations performed in connection with step 605 according to some embodiments. If σ is 2.56, if Δp(q)=−4.8 (i.e., −1.88σ), and if the price change categories are as shown below in Table 3, module 142 would identify category 4 and store an indicator of category −1 as C(q).

TABLE 3

| price change category | range of price change values |
|---|---|
| −4 | price change < −4σ |
| −3 | −4σ ≤ price change < −3σ |
| −2 | −3σ ≤ price change < −2σ |
| −1 | −2σ ≤ price change < −σ |
| 0 | −σ ≤ price change < σ |
| 1 | σ ≤ price change < 2σ |
| 2 | 2σ ≤ price change < 3σ |
| 3 | 3σ ≤ price change < 4σ |
| 4 | 4σ ≤ price change |

From step 605, module 142 continues to step 606. In step 606, module 142 selects a code corresponding to C(q). In some embodiments having price change categories such as those set forth in Table 3, the codes may be binary digits as set forth in Table 4.

TABLE 4

| price change category | code |
|---|---|
| −4 | 1110 |
| −3 | 1100 |
| −2 | 1010 |
| −1 | 1000 |
| 0 | 0 |
| 1 | 1001 |
| 2 | 1011 |
| 3 | 1101 |
| 4 | 1111 |

The coding scheme of Table 4 offers several advantages. Because only one code begins with a zero, a single zero digit can be used for that code instead of multiple zero digits. By assigning that code to a +/−1σ range of price change values, a single digit can be used for approximately 68% of all times t when price change values have a normal distribution. This may allow substantial reduction of memory requirements. With regard to the remaining codes, the least significant digit can be used to indicate if a code corresponds to a positive range of price change values ("1" for categories 1 through 4) or to a negative range of price change values ("0" for categories −1 through −4). In step 607, module 142 stores the code selected for time t(q).

In step 608, module 142 determines if a stop condition has occurred. For example, module 142 may be configured to determine if a new value for σ is available and if the code table used in step 605 must be updated. If a stop condition has occurred, and as shown by the "yes" branch from step 608, module 142 stops performing algorithm 600. If a stop condition has not occurred, and as shown by the "no" branch, module 142 continues to step 609, increments the q counter by 1, and returns to step 602 to start a new iteration of algorithm 600.

Figure 8:
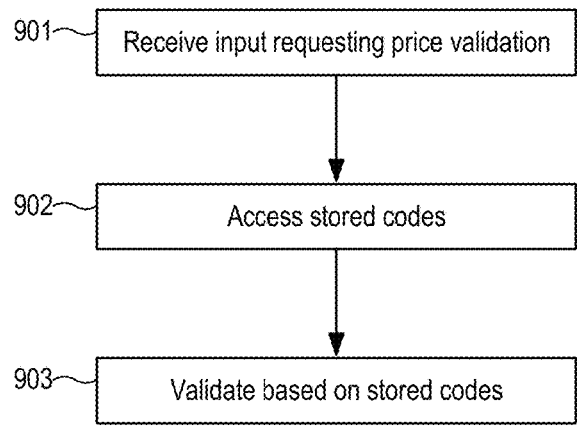
FIG. 8 is a flow chart showing additional operations performed by a computer system according to some embodiments.

As with codes generated and stored during execution of algorithm 300, codes generated and stored during execution of algorithm 600 can be processed to generate various types of displays of the encoded information. Codes generated and stored during execution of algorithm 600 can also be used in other ways. FIG. 8 is a flow chart showing additional operations than can be performed by one or more modules of computer system 100 using codes stored in algorithm 300 or algorithm 600. In step 901, computer system 100 receives an input requesting price validation. That input may be, for example, an order for a financial product, which order may include a bid or ask price that must be validated against historical price levels. As another example, the input may be an indication that an instance of a financial product is to be settled, and validation of the settlement price may require validation against historical price levels.

In step 902, computer system accesses codes stored during performance of algorithm 300, algorithm 600, or a similar algorithm according to other embodiments. In step 903, the price associated with the input received in step 901 is validated based on categories corresponding to the accessed codes. Price validation can be performed in various manners. As but one example, and assuming codes have been stored for previous time frames F using algorithm 300, the input received in step 901 may include a subject price change that is in category 3. If stored data indicates that category 3 price changes have only occurred twice in the previous 90 day period or have not occurred at all in the previous 60 day period, the subject price change may be flagged as an abnormal price movement and instructions generated to recheck data from which the subject price change was calculated.

The above represents but one example. Numerous other criteria could be established for determining whether a price change is to be flagged as abnormal and data underlying that price change is to be subjected to further checking. Additional examples include, without limitation, the following:

Example I. A subject price change is flagged as abnormal if a category applicable to that subject price change applies to less than 5% of the last 90 days.

Example II. A subject price change is flagged as abnormal if a category applicable to that subject price change applies to less than 10 of the last 90 days AND applies to less than 3 of the last 10 days.

Example III. A subject price change is flagged as abnormal if less than 20 of the last 90 days AND less than 3 of the last 10 days have an applicable category that is either (a) the category applicable to that subject price change or (b) a category corresponding to price movement larger than the subject price change.

Additional embodiments include numerous variations on the exemplary features described thus far. As but one example, different numbers of categories may be available for use in performing operations such as described in connection with step 320 (FIG. 3B) or step 605 (FIG. 6). Categories may also correspond to ranges of values different from the examples provided herein.

In addition to the embodiments described herein, embodiments include a computer system comprising at least one processor and at least one non-transitory memory. The at least one non-transitory memory may store instructions that, when executed, cause the computer system to perform operations that include (a) calculating a price change value for each of times $t(m,1)$ through $t(m,N)$ for which there is data representing a price value, wherein the times $t(m,1)$ through $t(m,N)$ are during a time frame $F(m)$; (b) identifying, for each of the times $t(m,1)$ through $t(m,N)$ for which a price change value is calculated, a price change category corresponding to a range of price changes that includes that price change value, wherein each identified category is a member of a group of price change categories, wherein each of the price change categories in the group corresponds to a different range of price changes; (c) selecting, from a code table comprising codes for each of multiple different combinations of price change categories, a code for time frame $F(m)$ corresponding to the price change categories identified for the times $t(m,1)$ through $t(m,N)$; (d) storing the code selected for time frame $F(m)$; and (e) repeating (a) through (d) for multiple iterations, each iteration corresponding to a different value of m and a successively later time frame.

In some embodiments, the at least one non-transitory memory of the above-mentioned computer system may also or alternatively store instructions that, when executed, cause the computer system to perform operations that include (a) calculating a price change $\Delta P(q)$, wherein the price change $\Delta P(q)$ corresponds to a time $t(q)$ and is based on a difference between a price corresponding to the time $t(q)$ and a price corresponding to a previous time $t(q-1)$; (b) identifying a price change category for $\Delta P(q)$, wherein the identified category is a member of a group of price change categories, wherein each of the price change categories in the group corresponds to a different range of price changes, and wherein the price change category identified for $\Delta P(q)$ corresponds to a range of price changes that includes $\Delta P(q)$; (c) storing a code corresponding to the price change category identified for $\Delta P(q)$; and (d) repeating (a) through (c) for multiple iterations, each iteration corresponding to a successively incremented value of q and a successively later time.

Conclusion

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method including:
determining, by a processor, a specific value change for an object, the specific value change corresponding to a difference in value for the object at a start of a specific interval and at an end of the specific interval, the specific interval identified via a specific interval machine code;
establishing, by the processor and in a memory, a data structure the data structure including machine-coded categories each identified via a respective category machine code, each machine-coded category corresponding to a respective change size range;
determining, after establishing the data structure and by the processor, that a stop condition for a range-determination algorithm has occurred;
adjusting, based on the stop condition and by the processor, a respective change size range for at least one of the machine-coded categories;
determining, by the processor, a specific change size range for the specific value change;
determining, by the processor and based on the specific change size range, to place the specific value change in a specific machine-coded category from among the machine-coded categories of the data structure;
committing, by the processor, the specific value change to the specific machine-coded category by concatenating the specific interval machine code with a specific category machine code corresponding to the specific machine-coded category to generate a specific value change code;
storing the specific value change code within the data structure, thereby compressing value change data by storing change size range data in lieu of individual change size data;
receiving a request for a validation of a transaction including the object, the transaction occurring within the specific interval;
accessing, by the processor, the data structure to analyze a duration spanning multiple intervals including the specific interval;
determining, by the processor, that occupancy in the specific machine coded category of the data structure is below a defined threshold for the duration;
determining, by the processor and based on the below-threshold occupancy, that the specific value change includes an abnormal value change; and
flagging, by the processor and based on determining that the specific value change includes the abnormal value change, the specific interval without providing the validation.

2. The method of claim 1, where the object includes a financial product and the specific value change includes a price change.

3. The method of claim 1, further including initiating, responsive to the flagging, a recheck of the transaction.

4. The method of claim 1, where the multiple intervals each include a one-day period and the duration includes a ninety-day period.

5. The method of claim 1, where each category machine code includes a binary code.

6. The method of claim 1, where each category machine code whether the corresponding machine-coded category includes positive ranges or negative ranges.

7. The method of claim 1, where a predetermined digit from each category machine code indicates whether the corresponding machine-coded category includes positive ranges or negative ranges.

8. The method of claim 1, where each category machine code has an identical code length.

9. The method of claim 8, where the identical code length is different from a code length used for a machine code that indicates that no value change occurred within an interval.

10. A product including:
non-transitory machine readable media; and
instructions stored on the non-transitory machine readable media, the instructions configured to cause a processor to:
determine a specific value change for an object, the specific value change corresponding to a difference in value for the object at a start of a specific interval and at an end of the specific interval, the specific interval identified via a specific interval machine code;
establish a data structure including machine-coded categories each identified via a respective category machine code, each machine-coded category corresponding to a respective change size range;
determine, after establishing the data structure, that a stop condition for a range-determination algorithm has occurred;
adjust, based on the stop condition, a respective change size range for at least one of the machine-coded categories;
determine a specific change size range for the specific value change;
determine, based on the specific change size range, to place the specific value change in a specific machine-coded category from among the machine-coded categories of the data structure;
commit the specific value change to the specific machine-coded category by concatenating the specific interval machine code with a specific category machine code corresponding to the specific machine-coded category to generate a specific value change code;
store the specific value change code within the data structure, thereby compressing value change data by storing change size range data in lieu of individual change size data;
receive a request for a validation of a transaction including the object, the transaction occurring within the specific interval;
access the data structure to analyze a duration spanning multiple intervals including the specific interval;
determine that occupancy in the specific machine coded category of the data structure is below a defined threshold for the duration;
determine based on the below-threshold occupancy, that the specific value change includes an abnormal value change; and
flag, based on determining that the specific value change includes the abnormal value change, the specific interval without providing the validation.

11. The product of claim 10, where the object includes a financial product and the specific value change includes a price change.

12. The product of claim 10, where the instructions are further configured to cause the processor to initiate, after the specific value change is flagged, a recheck of the transaction.

13. The product of claim 10, where the multiple intervals each include a one-day period and the duration includes a ninety-day period.

14. The product of claim 10, where each category machine code includes a binary code.

15. The product of claim 10, where each category machine code indicates whether the corresponding machine-coded category includes positive ranges or negative ranges.

16. The product of claim 10, where a predetermined digit from each category machine code indicates whether the corresponding machine-coded category includes positive ranges or negative ranges.

17. The product of claim 10, where each category machine code has an identical code length.

18. The product of claim 17, where the identical code length is different from a code length used for a machine code that indicates that no value change occurred within an interval.

19. A system including:
means for determining a specific value change for an object, the specific value change corresponding to a difference in value for the object at a start of a specific interval and at an end of the specific interval, the specific interval identified via a specific interval machine code;
means for establishing a data structure including machine-coded categories each identified via a respective category machine code, each machine-coded category corresponding to a respective change size range;

means for determining, after establishing the data structure, that a stop condition for a range-determination algorithm has occurred;

adjusting, based on the stop condition, a respective change size range for at least one of the machine-coded categories;

means for determining a specific change size range for the specific value change;

means for determining, based on the specific change size range, to place the specific value change in a specific machine-coded category from among the machine-coded categories of the data structure;

means for committing the specific value change to the specific machine-coded category by concatenating the specific interval machine code with a specific category machine code corresponding to the specific machine-coded category to generate a specific value change code;

means for storing the specific value change code within the data structure, thereby compressing value change data by storing change size range data in lieu of individual change size data;

means for receiving a request for a validation of a transaction including the object, the transaction occurring within the specific interval;

means for accessing the data structure to analyze a duration spanning multiple intervals including the specific interval;

means for determining that occupancy in the specific machine coded category of the data structure is below a defined threshold for the duration;

means for determining based on the below-threshold occupancy, that the specific value change includes an abnormal value change; and means for flagging, based on determining that the specific value change includes the abnormal value change, the specific interval without providing the validation.

20. The system of claim 19, where a predetermined digit from each category machine code indicates whether the corresponding machine-coded category includes positive ranges or negative ranges.

\* \* \* \* \*